(12) United States Patent
Ravid et al.

(10) Patent No.: US 8,391,614 B2
(45) Date of Patent: Mar. 5, 2013

(54) DETERMINING NEAR DUPLICATE "NOISY" DATA OBJECTS

(75) Inventors: Yiftach Ravid, Rosh Haayin (IL); Amir Milo, Kfar Saba (IL)

(73) Assignee: Equivio Ltd., Rosh Haayin (IL)

( * ) Notice: Subject to any disclaimer, the term of this patent is extended or adjusted under 35 U.S.C. 154(b) by 1194 days.

(21) Appl. No.: 12/161,775

(22) PCT Filed: Jan. 25, 2007

(86) PCT No.: PCT/IL2007/000095
§ 371 (c)(1),
(2), (4) Date: Jul. 22, 2008

(87) PCT Pub. No.: WO2007/086059
PCT Pub. Date: Aug. 2, 2007

(65) Prior Publication Data
US 2010/0150453 A1    Jun. 17, 2010

Related U.S. Application Data

(60) Provisional application No. 60/761,768, filed on Jan. 25, 2006.

(51) Int. Cl.
*G06K 9/68* (2006.01)
*G06K 9/40* (2006.01)
(52) U.S. Cl. .................................. 382/218; 382/275
(58) Field of Classification Search .............. 382/218, 382/275
See application file for complete search history.

(56) References Cited

U.S. PATENT DOCUMENTS

| | | | |
|---|---|---|---|
| 5,805,747 A | 9/1998 | Bradford | |
| 5,850,480 A | 12/1998 | Scanlon | |
| 5,850,561 A | 12/1998 | Church et al. | |
| 5,889,897 A * | 3/1999 | Medina | 382/310 |
| 5,909,677 A | 6/1999 | Broder et al. | |
| 5,950,146 A | 9/1999 | Vapnik | |
| 6,005,973 A | 12/1999 | Seybold et al. | |
| 6,119,124 A | 9/2000 | Broder et al. | |
| 6,189,002 B1 | 2/2001 | Roitblat | |
| 6,230,155 B1 | 5/2001 | Broder et al. | |
| 6,240,409 B1 * | 5/2001 | Aiken | 1/1 |
| 6,341,176 B1 | 1/2002 | Shirasaki et al. | |
| 6,349,296 B1 | 2/2002 | Broder et al. | |
| 6,654,739 B1 | 11/2003 | Apte et al. | |
| 6,658,423 B1 * | 12/2003 | Pugh et al. | 1/1 |
| 6,668,085 B1 | 12/2003 | Evans | |

(Continued)

FOREIGN PATENT DOCUMENTS
WO    WO 2006/000873 A2    1/2006

OTHER PUBLICATIONS

Conrad et al., "Online Duplicate Document Detection: Signature Reliability in a Dynamic Retrieval Environment", CIKM '03, Nov. 3-8, 2003, pp. 443-452.

(Continued)

*Primary Examiner* — John Strege
(74) *Attorney, Agent, or Firm* — Oliff & Berridge, PLC

(57) ABSTRACT

A system configured to find near duplicate documents. For each two (or more) documents that are similar to each other, the system is configured to identify which of the differences is likely to be generated by an Optical Character Recognition software or otherwise due to difference between the original documents. As a result, the process of identifying similarity between documents is improved by identifying documents that were originally exact duplicates but are different one with respect to the other only due to OCR errors, or correct the similarity level between the documents by correcting errors introduced by the OCR tool.

18 Claims, 7 Drawing Sheets

U.S. PATENT DOCUMENTS

| | | | |
|---|---|---|---|
| 6,708,165 B2 | 3/2004 | Jeffrey | |
| 6,751,628 B2 | 6/2004 | Coady | |
| 7,035,876 B2 | 4/2006 | Kawai et al. | |
| 7,092,567 B2 | 8/2006 | Ma et al. | |
| 7,660,819 B1* | 2/2010 | Frieder et al. | 707/999.107 |
| 7,734,627 B1* | 6/2010 | Tong | 707/737 |
| 7,779,002 B1* | 8/2010 | Gomes et al. | 707/728 |
| 8,015,124 B2* | 9/2011 | Milo et al. | 706/12 |
| 2002/0168099 A1* | 11/2002 | Noy | 382/149 |
| 2003/0133623 A1* | 7/2003 | Lee et al. | 382/270 |
| 2006/0026204 A1* | 2/2006 | Campbell | 707/104.1 |
| 2009/0028441 A1* | 1/2009 | Milo et al. | 382/218 |

OTHER PUBLICATIONS

Abdur Chowdhury, "Duplicate Data Detection", Apr. 16, 2007; pp. 1-8, http://www.it.iit.edu/~abdur/Research/Duplicate.html.

Vladimir I. Levenshtein, "Levenshtein Distance", Algorithms and Theory of Computation Handbook, U.S. National Institute of Standards and Technology, Aug. 14, 2008, pp. 1-2, CRC Press LLC., http://www.nist.gov/dads/HTML/Levenshtein.html.

* cited by examiner

DETERMINING NEAR DUPLICATE "NOISY" DATA OBJECTS

CROSS REFERENCE TO RELATED APPLICATIONS

The invention claims priority from U.S. Provisional Application No. 60/761,768 dated Jan. 25, 2006, which is herein incorporated by reference.

FIELD OF THE INVENTION

The present invention is in the general field of detecting near duplicate documents.

BACKGROUND OF THE INVENTION

The need to detect near duplicate documents arises in many applications. Typical, yet not exclusive, an example being in litigation proceedings, where one or both of the rival parties initiates discovery proceedings which force the rival party to reveal all the documents in his disposal that pertain to the legal dispute.

In order to meet the requirements of the discovery procedure, the disclosing party submits piles of documents, sometimes in order to duly meet the full disclosure stipulations, or in certain other cases, as a tactical measure to flood the other party with numerous amounts of documents, thereby incurring the receiving party considerable legal expenses in the tedious task of determining which documents are relevant to the dispute under consideration. In many cases, out of the repertoire of disclosed documents, many are similar to each other. A preliminary knowledge which will group and/or flag documents that are similar one to the other, would streamline the screening process, since for example, if a certain document is classified as irrelevant, then probably all the documents that are similar thereto, are also deemed irrelevant. There are numerous other applications for determining near duplicate documents, sometimes from among a very large archive of documents (possibly at the order of e.g. millions of documents or more).

As is well known, there exist documents which are contaminated with "noise", i.e. errors introduced to original documents. Examples of "noise" are error(s) introduced by translation tools such as Optical Character Recognition (OCR) errors, errors introduced due to network transmission problems, errors introduced due to damaged storage media, etc.

Turning for example to translation tools, such as OCR software, they are error prone with error percentage depending on quality of input, language, quality of OCR software, and so forth.

Noisy documents are, for instance, text files that were generated by digitizing or scanning paper (or similar media) and then using translation tools (such as Optical Character Recognition OCR) to translate the digitize image to text files (referred to also as translated documents).

In the context of the invention OCR includes a computer software (and or in other form) designed to translate images of handwritten or typewritten text (usually captured by a scanner) into machine-editable text, or to translate pictures of characters into a standard encoding scheme representing them (e.g. ASCII or Unicode).

Focusing, for example, on translated documents, finding near duplicates among them is more difficult as the OCR errors add "noise" and there is a need to discern between changes that were introduced by noise (say OCR errors), which obviously should be ignored and true differences between the documents which should be taken into account in order to determine to what extent the documents are identical.

In accordance with another example, due to translated errors, true duplicate documents (i.e. two identical source documents) are, in many cases, not likely to remain identical after applying thereto digitizing and OCR.

There is thus a need in the art to provide a tool for identifying near duplicate documents among noisy documents.

There is a further need in the art to provide a tool for identifying true duplicate documents among noisy documents.

LIST OF RELATED ART

WO 2006/00873: A Method for Determining Near Duplicate Data Objects

A system for determining that a document B is a candidate for near duplicate to a document A with a given similarity level th. The system includes a storage for providing two different functions on the documents, each function having a numeric function value. The system further includes a processor associated with the storage and configured to determine that the document B is a candidate for near duplicate to the document A, if a condition is met. The condition includes: for any function $f_i$ from among the two functions, $|f_i(A)-f_i(B)| \leq \delta_i(f,A,\text{th})$.

U.S. Pat. No. 6,119,124: Method for Clustering Closely Resembling Data Objects.

A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints, are selected to generate a sketch of each data object. The sketches characterize the resemblance of the data objects. The sketches can be further partitioned into a plurality of groups. Each group is fingerprinted to form a feature. Data objects that share more than a certain numbers of features are estimated to be nearly identical.

U.S. Pat. No. 6,189,002: Process and System for Retrieval of Documents Using Context-Relevant Semantic Profiles A process and system for database storage and retrieval are described along with methods for obtaining semantic profiles from a training text corpus, i.e., text of known relevance, a method for using the training to guide context-relevant document retrieval, and a method for limiting the range of documents that need to be searched after a query. A neural network is used to extract semantic profiles from text corpus. A new set of documents, such as World Wide Web pages obtained from the Internet, is then submitted for processing to the same neural network, which computes a semantic profile representation for these pages using the semantic relations learned from profiling the training documents. These semantic profiles are then organized into clusters in order to minimize the time required to answer a query. When a user queries the database, i.e., the set of documents, his or her query is similarly transformed into a semantic profile and compared with the semantic profiles of each cluster of documents. The query profile is then compared with each of the documents in that cluster. Documents with the closest weighted match to the query are returned as search results.

U.S. Pat. No. 6,230,155: Method for Determining the Resemining the Resemblance of Documents A method for facilitating the comparison of two computerized documents. The method includes loading a first document into a random access memory (RAM), loading a second document into the RAM, reducing the first document into a first sequence of tokens, reducing the second document into a second sequence of tokens, converting the first set of tokens to a first (multi)set of shingles, converting the second set of tokens to a second (multi)set of shingles, determining a first sketch of the first (multi)set of shingles, determining a second sketch of the second (multi)set of shingles, and comparing the first sketch and the second sketch. The sketches have a fixed size, independent of the size of the documents. The resemblance of two documents is provided, using a sketch of each document. The sketches may be computed fairly fast and given two sketches, the resemblance of the corresponding documents can be computed in linear time in the size of the sketches.

U.S. Pat. No. 6,240,409: Method and Apparatus for Detecting and Summarizing Document Similarity Within Large Document Sets A method and apparatus are disclosed for comparing an input or query file to a set of files to detect similarities and formatting the output comparison data are described. An input query file that can be segmented into multiple query file substrings is received. A query file substring is selected and used to search a storage area containing multiple ordered file substrings that were taken from previously analyzed files. If the selected query file substring matches any of the multiple ordered file substrings, match data relating to the match between the selected query file substring and the matching ordered file substring is stored in a temporary file. The matching ordered file substring and another ordered file substring are joined if the matching ordered file substring and the second ordered file substring are in a particular sequence and if the selected query file substring and a second query file substring are in the same particular sequence. If the matching ordered file substring and the second query file substring match, a coalesced matching ordered substring and a coalesced query file substring are formed that can be used to format output comparison data.

U.S. Pat. No. 6,349,296: Method for Clustering Closely Resembling Data Objects

A computer-implemented method determines the resemblance of data objects such as Web pages. Each data object is partitioned into a sequence of tokens. The tokens are grouped into overlapping sets of the tokens to form shingles. Each shingle is represented by a unique identification element encoded as a fingerprint. A minimum element from each of the images of the set of fingerprints associated with a document under each of a plurality of pseudo random permutations of the set of all fingerprints, are selected to generate a sketch of each data object. The sketches characterize the resemblance of the data objects. The sketches can be further partitioned into a plurality of groups. Each group is fingerprinted to form a feature. Data objects that share more than a certain number of features are estimated to be nearly identical.

U.S. Pat. No. 6,658,423: Detecting Duplicate and Near-Duplicate Files

Improved duplicate and near-duplicate detection techniques may assign a number of fingerprints to a given document by (i) extracting parts from the document, (ii) assigning the extracted parts to one or more of a predetermined number of lists, and (iii) generating a fingerprint from each of the populated lists. Two documents may be considered to be near-duplicates if any one of their respective fingerprints match.

U.S. Pat. No. 6,654,739: Lightweight Document Clustering

A procedure for clustering documents that operates in high dimensions processes tens of thousands of documents and groups them into several thousand clusters or, by varying a single parameter, into a few dozen clusters. The procedure is specified in two parts: computing a similarity score representing the k most similar documents (typically the top ten) for each document in the collection, and grouping the documents into clusters using the similar scores.

U.S. Pat. No. 6,751,628: Process and System for Sparse Vector and Matrix Representation of Document Indexing and Retrieval A new data structure and algorithms which offer at least equal performance in common sparse matrix tasks, and improved performance in many. This is applied to a word-document index to produce fast build and query times for document retrieval.

U.S. Pat. No. 6,708,165: Wide-Spectrum Information Search Engine

A method and computer program product for comparing documents includes segmenting a judgment matrix into a plurality of information sub-matrices where each submatrix has a plurality of classifications and a plurality of terms relevant to each classification; evaluating a relevance of each term of the plurality of terms with respect to each classification of each information matrix of the information submatrices; calculating an information spectrum for a first document based upon at least some of the plurality of terms; calculating an information spectrum for a second document based upon at least some of the plurality of terms; and identifying the second document as relevant to the first document based upon a comparison of the calculated information spectrums.

Abdur Chowdhury Duplicate Data Detection

The algorithm is based on IDF of the tokens. The algorithm steps are:

1. Get document.
2. Parse document into a token steam, removing format tags.
3. Using term thresholds (idf), retain only significant tokens.
4. Insert relevant tokens into unicode ascending ordered tree of unique tokens.
5. Loop through token tree and add each unique token to the SHA1 (1995) digest. Upon completion of token tree loop, a (doc_id, SHA1 Digest) tuple is defined.
6. The tuple (doc_id, SHA1 Digest) is inserted into the storage data structure based on SHA1 Digest key.
7. If there is a collision of digest values, then the documents are similar.

Conrad et al: In a series of a few papers, they describe a method that is based on the IDF measure of tokens, and the size of the documents. They also provide a method of selecting the corpus to evaluate the IDF of a token.

| U.S. Patent | Issue date | Title |
| --- | --- | --- |
| 5,889,897 | Mar. 30, 1999 | Methodology for OCR error checking through text image regeneration |
| 5,805,747 | Sep. 8, 1998 | Apparatus and method for OCR character and confidence determination using multiple OCR devices |

| U.S. Patent | Issue date | Title |
|---|---|---|
| 7,092,567 | Aug. 15, 2006 | Post-processing system and method for correcting machine recognized text |

U.S. Pat. No. 5,889,897: Methodology for OCR Error Checking Through Text Image Regeneration A method of reducing errors in optical character recognition (OCR) procedures includes digitizing an image of an object, the image containing alpha-numeric characters, and storing a bitmap of the digitized image as a scanned document file (SDF). An OCR step is performed to obtain at least one candidate character, and an indication of the at least one candidate character is stored in a textural results file (TRF). The font of the digitized image is determined and the font is stored in a regeneration library file (RLF). A regenerated image file is generated using the TRF and the RLF. At least a portion of the regenerated image file is compared with a corresponding portion of the bitmap of the digitized image stored in the SDF. The TRF is outputted if the results of the comparison indicate a match of at least the portion of the regenerated image file with the corresponding portion of the bitmap. If a match is not found, further processing is performed to resolve the mismatch.

U.S. Pat. No. 5,805,747: Apparatus and Method for OCR Character and Confidence Determination Using Multiple OCR Devices In an optical character recognition (OCR) system an improved method and apparatus for recognizing the character and producing an indication of the confidence with which the character has been recognized. The system employs a plurality of different OCR devices each of which outputs a indicated (or recognized) character along with the individual devices own determination of how confident it is in the indication. The OCR system uses that data output from each of the different OCR devices along with other attributes of the indicated character such as the relative accuracy of the particular OCR device indicating the character to choose the select character recognized by the system and to produce a combined confidence indication of how confident the system is in its recognition.

U.S. Pat. No. 7,092,567: Post-Processing System and Method for Correcting Machine Recognized Text A method of post-processing character data from an optical character recognition (OCR) engine and apparatus to perform the method. This exemplary method includes segmenting the character data into a set of initial words. The set of initial words is word level processed to determine at least one candidate word corresponding to each initial word. The set of initial words is segmented into a set of sentences. Each sentence in the set of sentences includes a plurality of initial words and candidate words corresponding to the initial words. A sentence is selected from the set of sentences. The selected sentence is word disambiguity processed to determine a plurality of final words. A final word is selected from the at least one candidate word corresponding to a matching initial word. The plurality of final words is then assembled as post-processed OCR data.

SUMMARY OF THE INVENTION

The invention provides a method for correcting errors in a document translated from a digital document that is obtained by scanning a source medium, comprising
 (a) correcting features in the translated document without having a true reference of the features.
 In accordance with certain embodiments of the second aspect the method includes:
  (i) providing a function applied on at least two features in the translated document, such that the function result applied to each of the features would be the same if the at least two features are close to each other at a predefined criterion.
 In accordance with certain embodiments, each feature being at least one word and wherein said true reference being a dictionary meaning of said word.
 In accordance with certain embodiments of the second aspect said documents include text and numbers.
 In accordance with certain embodiments, there is provided a method for determining that a document B is a candidate for near duplicate to a document A; said document A is translated from a digital document that is obtained by scanning a source medium and said document B is translated from a digital document that is obtained by scanning a source medium, the method comprising:
  (a) applying correction to said documents A and B, giving rise to a corrected document A and a corrected document B;
  (b) applying a near-duplicate technique to the corrected documents.
 In accordance with certain embodiments, there is provided a method for determining that a document B is a candidate for near duplicate to a document A; said document A is translated from a digital document that is obtained by scanning a source medium and said document B is translated from a digital document that is obtained by scanning a source medium, the method comprising:
  (a) applying a near-duplicate technique to the documents A and B; and in the case that the documents are candidates for near duplicate,
  (b) applying correction to said documents A and B;
 In accordance with certain embodiments, there is provided a method of the kind specified, capable of identifying documents that are different only due to translation error.
 There is further provided a method for constructing a glossary operable to mask noise features in at least two documents that are similar in accordance with a criterion; the noise features being nominally identical features that appear differently in the documents, the method comprising:
  a) providing a discrepancy list for the at least two documents that includes the noise features; and
  b) constructing a glossary for masking the noise features utilizing at least the discrepancy list.
 The invention further provides a method for searching data using features, comprising:
  a. providing at least one feature for search data;
  b. utilizing the glossary according to anyone of claims 1 to 14, for masking at least one of said features, if any;
  c. searching said data utilizing at least said masked features.
 Still further, the invention provides a method for masking noise errors in at least two documents wherein nominally identical features appear differently, the method comprising:
  a) maintaining a glossary for mapping noise features in any of the documents to common mapped features;

b) comparing respective pairs of features in at least two documents; for each pair of features that differ by less than a predetermined threshold, if none of the features appear in the glossary, mapping said pair of features to a common mapped feature and automatically adding the mapped feature to the glossary; or if at least one of the pair of features appears in the glossary, extracting from the glossary the common mapped feature and automatically replacing said feature by the common mapped feature.

Still further, the invention provides a method for masking noise features in a document wherein, owing to an error, at least one feature in the document is misrepresented and appears as a noise feature, the method comprising:

a) maintaining a glossary that maps noise features in documents to common mapped features;

b) identifying at least one candidate document that is similar by at least a given threshold to said document, and for every candidate document, determining a discrepancy list that includes noise features being nominally identical features that appear differently in the document and the candidate document;

c) utilizing the discrepancy list for comparing corresponding features that originate from the document and the candidate document respectively, and in the case that the corresponding features differ in less than a predetermined threshold, if the corresponding features appear in the glossary, automatically masking said features by replacing said corresponding features by said common mapped feature.

Still further, the invention provides a method for determining whether at least one document A is a candidate for near duplicate to a document B; at least two of said documents include noise features being nominally identical features that appear differently in the documents; the method comprising:

(a) maintaining (i) a glossary configured to map noise features to common mapped features and (ii) a repository storing documents A;

(b) applying a near-duplicate technique to document B and to at least one of said stored documents A, for determining at least one document A that is candidate for near duplicate to document B.

(c) for each one of at least one of said candidate documents A, (i) utilizing the glossary, for said candidate document A and document B, for masking noise features, if any, by mapping said noise features into common mapped features, giving rise to masked documents;

(ii) determine resemblance between said masked documents.

The invention further provides a method for determining whether at least one masked document A is a candidate for near duplicate to a document B; at least two of said documents include noise features being nominally identical features that appear differently in the documents; the method comprising:

(a) maintaining (i) a glossary configured to map noise features to common mapped features, and (ii) a repository storing masked documents A;

(b) utilizing the glossary, for said document B, for masking noise features, if any, by mapping said noise features into common mapped features, giving rise to masked document B;

(c) applying a near-duplicate technique to the masked documents, for determining at least one masked document A that is candidate for near duplicate to the masked document B;

(d) for each one of at least one of said candidate documents A, (i) utilizing the glossary, for said candidate document A and masked document B, for masking noise features, if any, by mapping said noise features into common mapped features, giving rise to masked documents;

(ii) determine resemblance between said masked documents; and above threshold, (iii) identifying, in said document and masked document B, at least one pair of noise features, if any, which do not appear in the glossary, and in respect of each pair, mapping said pair of features to a respective common mapped feature and automatically adding said mapped feature to the glossary.

Still further, the invention provides a system for constructing a glossary operable to mask noise features in at least two documents that are similar in accordance with a criterion; the noise features being nominally identical features that appear differently in the documents, the system comprising:

means for providing a discrepancy list for the at least two documents that includes the noise features; and constructing system for constructing a glossary for masking the noise features utilizing at least the discrepancy list.

The invention further provides a system for determining whether at least one document A is a candidate for near duplicate to a document B; at least two of said documents include noise features being nominally identical features that appear differently in the documents; the system comprising:

a glossary configured to map noise features to common mapped features;

a repository storing documents A;

near-duplicate module configured to process said document B and at least one of said stored documents A, for determining at least one document A that is candidate for near duplicate to document B;

a system configured to be applied to for each one of at least one of said candidate documents A, and capable of (i) utilizing the glossary, for said candidate document A and document B, for masking noise features, if any, by mapping said noise features into common mapped features, giving rise to masked documents;

(ii) determine resemblance between said masked documents.

The invention still further provides a system for determining whether at least one masked document A is a candidate for near duplicate to a document B; at least two of said documents include noise features being nominally identical features that appear differently in the documents; the system comprising:

a glossary configured to map noise features to common mapped features;

a repository storing masked documents A;

a system configured to utilize the glossary, for said document B, for masking noise features, if any, by mapping said noise features into common mapped features, giving rise to masked document B;

a near-duplicate module to the masked documents, for determining at least one masked document A that is candidate for near duplicate to the masked document B;

a system configured to be applied to for each one of at least one of said candidate documents A, and capable of:

(i) utilizing the glossary, for said candidate document A and masked document B, for masking noise features, if any, by mapping said noise features into common mapped features, giving rise to masked documents;

(ii) determine resemblance between said masked documents; and above threshold, (iii) identifying, in said document and masked document B, at least one pair of noise features, if any, which do not appear in the glossary, and in respect of each pair, mapping said pair of features to a respective common mapped feature and automatically adding said mapped feature to the glossary.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
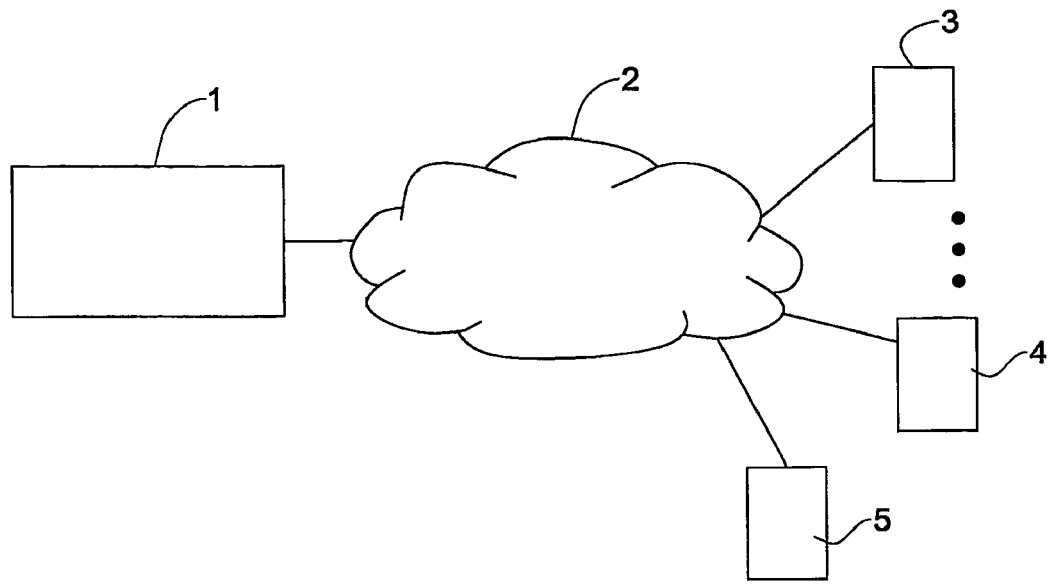
FIG. 1 illustrates a general system architecture, in accordance with an embodiment of the invention.

It should be noted that the invention is described for convenience, with reference to documents, such as files including text or representing text, such as Microsoft Word document, Excel documents, Mail documents, etc. Note that reference to documents embraces also derivatives thereof, such as known per se canonic representation of a document. In accordance with certain embodiments, documents include at least text and/or numbers. In some embodiments, the documents are Microsoft office® documents, such as e-mails in selected format. The format may be, for example, Microsoft Outlook, Lotus Notes, etc.

Note that the invention is not confined to documents, but applies also to other types of data objects, such as documents within a ZIP file, e-mails in MS Outlook PST file format, attachments, etc.

Throughout the description reference is made to objects (including documents) which are contaminated with noise (referred to also as noisy objects). For convenience, the description will refer to a specific instance of an object, i.e. document. This however is by no means binding.

In Noisy documents, errors are introduced to the documents. Examples of noise are error(s) introduced by translation tools such as OCR errors, errors introduced due to network transmission problems, errors introduced due to damaged storage media, etc. Consider for example translation tools, such as OCR software, which are error-prone with error percentage depending on quality of input, language, quality of OCR software, and so forth. The description below will refer for convenience to errors introduced by OCR translation tool. This however is by no means binding.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions, utilizing terms such as, "processing", "computing", "calculating", "determining", "providing", "constructing", "mapping", "identifying", "adding", "applying", "inserting", "generating", "comparing", "extracting", "replacing", "scanning", "masking" or the like, refer to the action and/or processes of a computer or computing system, or processor or similar electronic computing device, module that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may use terms such as, processor, computer, apparatus, system, sub-system, module, unit and device (in single or plural form) for performing the operations herein. This may be specially constructed for the desired purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Bearing this in mind, attention is first drawn to FIG. 1, illustrating a general system architecture, in accordance with an embodiment of the invention. Thus, system 1 is configured to receive through medium 2 documents from one or more sources (of which three 3-5 are shown in FIG. 1). The system 1 is configured to process the documents and to output indications, which documents are near duplicate whilst neutralizing errors in the case that the document(s) are noisy. The medium 2 may be local such that the one or more sources (3 to 5 in the example of FIG. 1) are stored in a storage medium associated with the system 1. In accordance with another embodiment, the documents are stored remotely and are transmitted, through, say, the Internet 2. System 1 may be a single computer or two or more processors accommodated locally or remotely one with respect to the other (not shown in FIG. 1).

Note that by one embodiment, the near duplicate indication can be provided as a service. Even as a service, there are a few options: for instance, the files are sent to a service bureau or, in accordance with another embodiment, the application is activated via a web-service. By this embodiment, documents stored at the subscriber site (say 3 to 5 in FIG. 1), are transmitted to a near duplicate service (say 1 in FIG. 1) and are processed to determine which documents are near duplicate whilst neutralizing errors in the case that the document(s) is (are) noisy. The processing will be described in further detail below. The indication (possibly which are near duplicate documents) is transmitted to the subscriber, and the latter is charged according to one out of few possible charging schemes. The charging schemes include: pay per document (or some quota of documents) checked, pay per document (or some quota of documents) that is found to have a similar or exact duplicate, one time license for the software or software rental per period, OEM agreements, and others.

The subscriber may be a one time subscriber, or by way of another example, a subscriber that requires the service repeatedly. Note the invention is not only bound for use by subscribers, and accordingly, different kind of users may utilize the system and method of the invention.

The invention is not bound by any specific application. Thus, by way of non-limiting example, the near duplicate technique can be used for determining near duplicate documents in a portfolio of documents processed during M&A, between two companies or more.

The neutralizing of errors in noisy document(s) for the purpose of determining near duplicate documents is not bound to any specific technique of determining near duplication. The description below with reference to FIGS. 2 to 5, refers to various non-limiting embodiments for determining near duplicate documents. The invention is by no means bound to these embodiments. In other words, masking of errors in noisy documents can be applied to the near duplication determination techniques described below or to any other technique or techniques, which the case may be.

Figure 2:
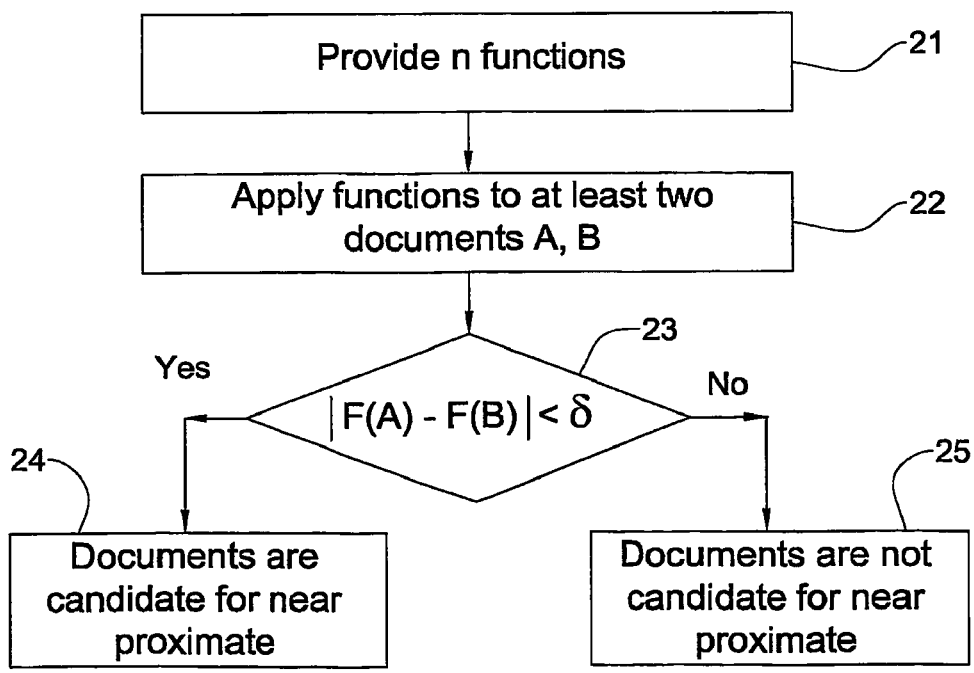
FIG. 2 illustrates a generalized sequence of operations for determination of near duplicate documents, in accordance with an embodiment of the invention.

Bearing this in mind, attention is drawn to FIG. 2, illustrating a generalized sequence of operations for determining near duplicate documents, in accordance with an embodiment of the invention. Thus, at the onset, at least two different functions (say by this example $f1$ and $f2$) are provided 21. Each function is from the space of document content to a number.

In accordance with a certain embodiment, each function having a function value bound by a respective minimum value min and a maximum value max. In accordance with certain embodiment, all the functions share the same minimum and maximum values (say 0 and 1 respectively).

Typical, yet not exclusive, example of functions are the known per se classifiers capable of discerning whether input data belongs to one group or the other. Examples of classifiers are Bayesian Classifier, Decision Trees, Support Vector Machine as disclosed in U.S. Pat. No. 5,950,146. As is known, classifiers are, as a rule, constructed on the basis of two training groups.

As is well known, in operation (following the training session), if a classifier is applied to a document, it will produce a score that reflects the association of the tested document to one of the training groups. For instance, if the classifier is trained on the basis of documents belonging to a first group (documents that relate to sports) and documents belonging to a second group (documents that relate to financials), then in operation, the score of a tested document would indicate how close it is to one of the specified groups, e.g. the closer the score of the tested document to 0, it is associated to the first group and likewise, the closer the score of the tested document to 1, it is associated to the second group.

In accordance with certain embodiments, a function can be applied, for example, in accordance with the number of features in the document. A feature for instance, may be a given word, two consecutive words, total number of words in the documents, total number of numbers, dates, etc. In still another embodiment, a function is a distance function. In accordance with certain embodiments, where a distance function(s) is used, each document is represented by a vector of numbers. Each number in the vector indicates, say the frequency (or count) of a specific word (or other combination of words) within the document. For instance, the first value (number) in the vector signifies the number of times that the word "word" appears in the document. The second value in the vector signifies the number of times that the word "other" appears in the document, and so forth.

Given now two vectors (say, for example, of the kind specified above), a distance function can be applied. For example, $L^\infty$ (Maximum distance), $L^2$ Euclidian distance (sum the squares of different values), $L^1$ (sum of the absolute differences), Jansen-Shannon divergence, etc.

Note that the invention is not bound by the specified functions, which are provided by way of example only.

In accordance with certain embodiments, a hybrid or combination of functions can be used. For example, $f1$, and $f2$ are classifiers, and $f3$ and $f4$ are distance functions. Other variants are applicable, depending upon the particular application.

Having described the characteristics of various functions, attention is drawn again to FIG. 2. The next stage (after providing at least two functions) is that the functions are applied to the documents 22. Any two documents A, B are determined to be candidates for near duplicate with level th if a condition is met. The condition includes: for any of the functions $f1$ and $f2$ (in the particular case that two functions are provided and for any of the n functions in another case that n functions are provided), when applied to documents A and B, $|f(A)-f(B)| \leq \delta(f,th,A)$, where $\delta$ is a function of at least $f$, th, and A. (23). Threshold th indicates the level of certainty of candidates for the near duplicate test. Consider, by way of non-limiting example, that a function $f$ is number of words and a document A having, say 250 words. If the threshold th equals 0.8, this means that documents having number of words ranging from 200 (0.8·250) to 312 (1.25·250) meet the criterion of near duplicate to document A for this particular function. Note that using a threshold of the kind specified is by no means binding.

Note that in certain embodiments $\delta(f,th)$, wherein $\delta$ is dependent upon at least $f$ and th.

Note that in certain embodiments $\delta(f,A)$, wherein $\delta$ is dependent upon at least $f$ and A.

Note also that, in accordance with certain other embodiments, the threshold is not a parameter of the function δ.

Note that the specified examples are not binding and accordingly, in certain embodiments, the condition may include additional requirements or a requirement that needs) to be met for meting the candidate for near duplicate condition.

Reverting now to the previous example, δ is dependent on $f$, th and A. Thus, in accordance with certain embodiments, in the case that the function $f$ is bound by a minimum value, min and maximum max (say, a classifier bound by the resulting values r($0 \leq r \leq 1$)), then said $\delta(f,th) = \alpha(th) \cdot |max-min|$, as will be explained in greater detail below. In accordance with certain embodiments, α can be selected to be in the range of $0 \leq \alpha(th) \leq 0.6$. In accordance with other embodiments where the function $f$ is not bound by a minimum value, min and maximum max (say for example certain distances functions), then $\delta(f,th,A) = \alpha(th) \cdot f(A)$ as will be explained in greater detail below. In accordance with certain embodiments, α can be a value selected in the range of $0 \leq \alpha(th) \leq 0.6$.

In accordance with certain embodiments, when the function is total number of words in a document or a classifiers, then $\alpha(th) = 1-th$. Assuming, for instance, that a function $f$ being number of words in a document, the document A having 250 words and threshold th=0.8. Now, by this example, $\alpha(th) = 1-th$, namely 0.2. $f(A)$ is 250, and accordingly $\delta(f,th,A) = \alpha(th) \cdot f(A) = 50$. This means that documents having number of words between 200 and 300 (i.e. $f(B)$ in the range of 200 to 300), will comply with the algorithmic expression $|f(A)-f(B)| \leq \delta(f,th,A)$, (namely, $|250-f(B)| \leq 50$). Note that the invention is not bound by the condition $\alpha(th) = 1-th$. Note also that the invention is not bound by the specified characteristics of $f$ (i.e. the specified examples of $f$ bound by max/min or, not).

If the specified conditions are met, then the documents A and B are determined to be candidates for near duplicate (24), and if the condition is not met, they are not candidates for near duplicate (25). Note that setting α to 0.6 is an example only. In accordance with another embodiment, it is 0.5 and in accordance with yet another example it is 0.4, and in accordance with still another embodiment, it is 0.3 and in accordance with still another embodiment, it is 0.2. These values are examples only and can be changed depending upon the particular application. For example, if the condition for determining candidates for near duplicate may also stipulate the number of classifiers used, it may affect the value of α. For instance, the larger the number the classifiers used, the lower the maximum value of α.

Note that a specific value can affect the desired resolution of determining near duplicate indication. For instance, in the case that α=0.1, this means that if a function $f$ (say, in the specific case that $f$ is a classified bound by the values 0-1) when applied to documents A and B gives rise to $|f(A)-f(B)|=0.11$, it indicates that documents A and B are not candidates for near duplicate. If, on the other hand, α=0.15, the same documents are regarded as candidates for near duplicate.

Note that in accordance with certain embodiments, the processes described above with reference to FIGS. 1 and 2, give rise to candidates for near duplicate indication, rather than final near duplicate indication. As will be explained in greater detail below, by these embodiments, additional processing phase is applied in order to determine whether candidates for near duplicate are indeed near duplicate documents (in higher degree of certainty), or not.

Those versed in the art will readily appreciate that the invention is not bound to only two documents and to only two functions. In fact, in accordance with certain embodiments, the more functions there are, the higher the prospects that the near duplicate indication is accurate.

Figure 3:
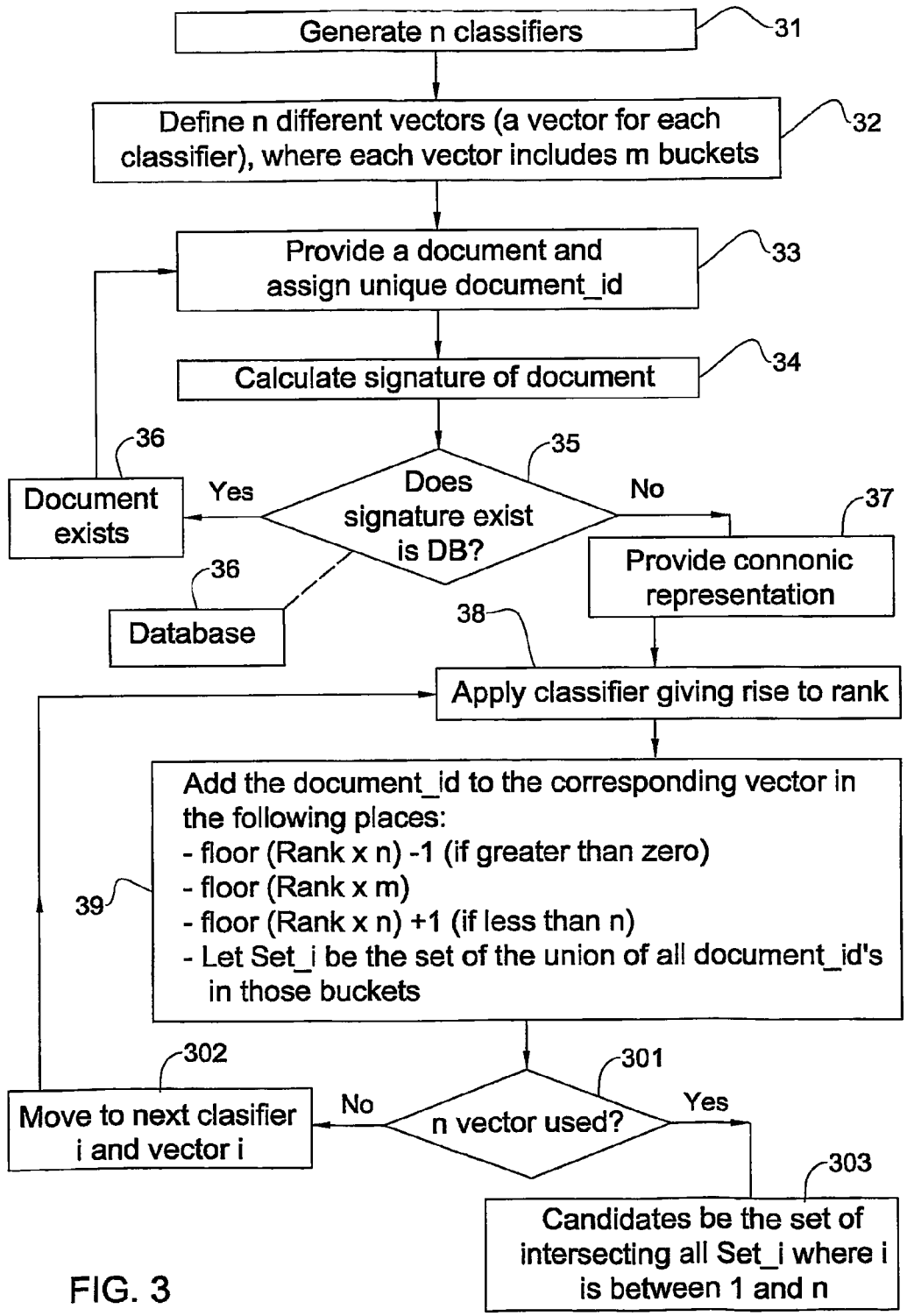
FIG. 3 illustrates a more detailed sequence of operations for determination of near duplicate documents, in accordance with an embodiment of the invention.
Figure 4:
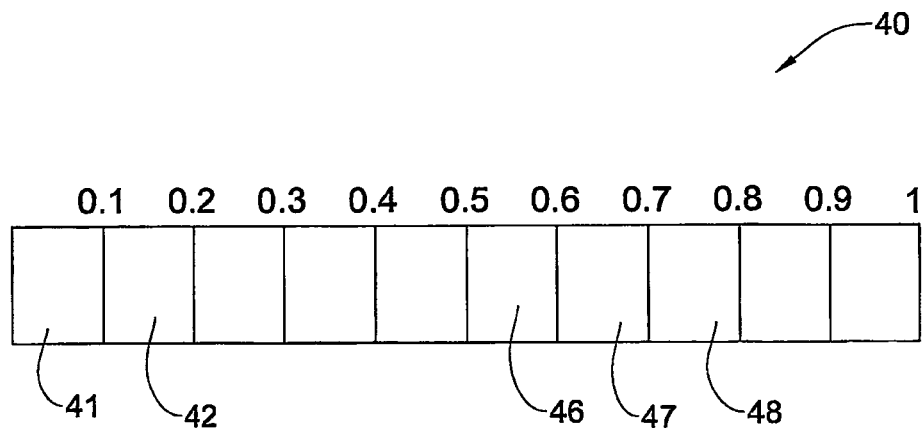
FIG. 4 illustrates an exemplary vector of buckets, used in one embodiment of the invention.

Turning now to FIG. 3, there is shown a more detailed sequence of operations, in accordance with an embodiment of the invention. As will be explained in greater detail below, in accordance with this embodiment, there is provided an additional technique for accomplishing improved performance. Note that by this embodiment, the functions that are used are classifiers of type SVM. Note that the invention is not bound by the use of functions in the form of classifiers and a fortiori not by the use of the classifier of the type. Note that the specific example with reference to FIG. 3, refers to $0<\alpha \leq 0.6$.

Thus, at the onset, m (at least two) classifiers are received or generated 31. For each classifier, a different vector is generated with n different values. By one example, the vector values are buckets 32. Next, a document under consideration is received and is associated with a unique identification code 33. Next, a signature of the document is calculated say by applying known per se checksum calculation 34. There is further provided a database 36, say, hash table, storing signatures of existing documents. In the case that the so calculated signature of the document exists in the database, this indicates that the document already exists 35 and control is returned to 33 for processing the next document. If, on the other hand, the signature does not exist, this indicates that the exact document does not exist and there is a need to determine whether this document is near duplicate to other documents. If necessary, the text of the document (say, e.g. a Microsoft Word™ document) is extracted and converted to canonical representation 37, all as known per se. Thereafter, a list of features (say, the known per se shingles, normally A k-shingle is a sequence of k consecutive words) is calculated in a known per se, manner. By this non-limiting example, the 1 list of features being 1-gram (frequency of words in the document), 2-grams (frequency of consecutive 2 words in the document), etc. The invention is not bound by a specific manner of calculating the features.

Next, the classifier is applied on the document (by this example to its representatives list of features), giving rise to a first function result (38) for this particular document identification. Note that the classifiers result (m classifiers) is bound by min–max values, and by this particular example, a value that falls in the range of 0 to 1. As may be recalled, the invention is not bound by the use of functions bound by min/max value and a fortiori not those that have min value=0 and max value=1. Also, as may be recalled, a hybrid (or combination) of functions can be used, and accordingly, in certain embodiments, one or more functions can be bound by min/max value and in accordance with other embodiments, one or more functions are not bound by min/max values.

Before moving on, note incidentally, that in accordance with an embodiment of the invention, this procedure is repeated for at least one additional classifier (applied to the same document id), giving rise to a second function result (also falling in the range of 0 to 1). For convenience, the first and second results are marked as $f_1(A), f_2(A)$, where A is the document under consideration. Now, if function results of applying these classifiers to another document (B) are available, say $f_1(B)$ and $f_2(B)$, it would be possible to determine whether, the documents are near duplicate. Thus, the documents would be regarded as near duplicate if $|f_1(A)-f_1(B)| \leq \alpha$ and $|f_2(A)-f_2(B)| \leq \alpha$, where by one embodiment α=0.3.

In accordance with certain embodiments, in the case where the value of the function is not bounded by a "small" number, the bucket implementation is less applicable. Therefore, in certain embodiments, a known per se "near neighbor algorithm" is used. Thus, for each document the values of the m different functions are calculated, and fed to the "near neighbor algorithm", as an m-dimensional point. The "near neighbor algorithm" can be queried on all points that are "close" to a certain point. Hence, an efficient algorithm is obtained to find all documents that are "close" to a certain document. Note, that in certain embodiments the "approximate near neighbor algorithm" can be used in order to speed-up performance.

Reverting now to the embodiment of FIG. 3, a procedure for expediting determination of near duplicate documents is applied. Note that each vector is divided to n values (buckets by this specific example), where n is say 10. Thus, for the case of range 0 to 1, each bucket covers a range 0.1 as shown in the exemplary vector 40 of FIG. 4. By this example the buckets are numbered 1 to 10, where the first bucket 41 covers the values 0-0.1, the second vector 42 covers the values 0.1 to 0.2, and so forth. In the general case for n buckets, each bucket is of size 1/n.

Bearing this in mind, assuming that applying the first classifier to document A (i.e. $f_1(A)$), gives rise to function result rank (in this example rank is between 0 and 1), then the result (in fact the document id) is assigned to the buckets in the following manner (39): 1) Floor(n·rank) (if greater than zero, otherwise discard this option), Floor(n·rank)+1, and Floor (n·rank)+2 (if less than n, otherwise discard this option). N as recalled is, by this example, 10. Thus, if the rank value is say 0.69, then applying the specified stipulation would lead to bucket 6 (covering the value 0.5 to 0.6), 7 (covering the value 0.6 to 0.7) and 8 (covering the value 0.7 to 0.8), associated with reference numerals 46, 47 and 48, respectively. Put differently, the document id of this document is assigned to buckets 6, 7 and 8.

Now, as an interim step, the union of documents Ids in the buckets are calculated (for this particular classifier) and is stored in a union set for this classifier. For instance, assuming that the document identification of the present document (which, as recalled, is assigned to buckets 6, 7 and 8) is $Id_{current}$ and a previous document having, say $Id_{prev}$ that was set (for the same classifier) to, say buckets 8 and 9 (in accordance with the calculating steps discussed above), then in accordance with this step, the union set for this classifier would store $Id_{current}$ and $Id_{prev}$, since bucket 8 stores both $Id_{current}$ and $Id_{prev}$. Moving on with this example, if the identification $Id_{prev-1}$ of another document is set to, say 1, 2 and 3 (in accordance with the calculating steps discussed above), then $Id_{prev-1}$ is not included in the union set for this classifier (together with $Id_{current}$ and $Id_{prev}$), since $Id_{prev-1}$ and $Id_{current}$ do not share any bucket (in other words, the union operator results in an empty set).

The procedure is repeated for the other n vectors of the m classifiers (301 and 302) [by this specific example 2 classifiers], giving rise to n different union sets. Each set holds (for its respective classifier) the documents ids that share a common bucket.

What remains to be done is to apply intersection to the specified sets (303). The result would be document Id's that share at least one bucket for every one of the m classifiers. These documents are announced as candidate near duplicate.

Note that the utilization of buckets in the manner specified, is one out of many possible variants of implementation of the specified condition that $|f(A)-f(B)| \leq \delta(f,th)$ and since the functions are bound by max/min values, then $\delta(f,th)=\alpha(th) \cdot |max-min|$, for the at least two functions (by this example classifiers, the values are between 0 and 1). As may be recalled by this example $\alpha=0.3$. Thus, consider for example two classifiers $f_1$ and $f_2$, where the result of applying $f_1$ to a first document (having document identification $Id_1$) gives rise to a result of, say 0.65, thereby falling, in accordance with the previous example to buckets 5, 6 and 7. When applying the same classifier $f_1$ to a second document (having document identification $Id_2$) it gives rise to a result of, say 0.89, thereby falling, in accordance with the previous example to buckets 7, 8 and 9. Now, the condition for candidates to near duplicate documents is met for $f_1$ since 0.89-0.65<0.3. If the same condition holds true when applying $f_2$ to the two documents (say 0.78 [buckets 6, 7 and 8] and 0.62 [buckets 5, 6 and 7], respectively, giving rise to a subtraction result of 0.16 being less than 0.3), then, the two documents are announced as candidates for near duplicate, since for both functions the condition is met. The same result would be obtained also when using the specific embodiment that implements the buckets. Thus, for the function $f_1$ documents $Id_1$ and $Id_2$ belong to the same set (since they meet the union condition due to the fact that they share bucket no. 7. They also belong to the same set for function $f_2$ since they share a bucket (by this example bucket 7). The intersection of the sets (in accordance with step 303 in FIG. 3) would lead to announcing that $Id_1$ and $Id_2$ are candidates for near duplicate.

In the specified examples, the documents A,B to which the functions were applied, were list of features obtained directly or indirectly, such as 1-grams, 2-grams, n-grams, etc.

Note that the mapping to buckets is strongly related to the value $\alpha$. Thus, when a function result is mapped to 3 buckets, each covering a range of 0.1, this results in a tolerance of 0.3, exactly the value of $\alpha$. Accordingly, for the specific case that a function result is mapped to 3 buckets, each bucket size equals to $\frac{1}{3} \cdot \alpha$. Had $\alpha$ would equal to 0.15, then each bucket size would be 0.05 (for the specific case of 3 buckets).

As mentioned before, the invention is not bound by the use buckets, and a fortiori not by the use of 3 buckets.

For a better understanding of the foregoing, consider the following example:

Assume that candidates for near-duplicate documents are found with th=80%, where all functions are bounded by 0 and 1. From the above let $\delta(f,th)=\alpha(th) \cdot |max-min|=\alpha(th)$. In the example let $\alpha(th)=0.2$. Using $\alpha(th)=0.2$, yields the use of $2/\alpha(th)=2/0,2=10$ buckets.

By these embodiments, the number of buckets is always $2/\alpha(th)$ this will ensure that if the rank of $doc_1$ is x (0.39) and the rank of $doc_2$ is y (0.58), they will join the same bucket.

| Vector | Buckets | | | | | | | | | |
|---|---|---|---|---|---|---|---|---|---|---|
| | 1 0.0-0.1 | 2 0.1-0.2 | 3 0.2-0.3 | 4 0.3-0.4 | 5 0.4-0.5 | 6 0.5-0.6 | 7 0.6-0.7 | 8 0.7-0.8 | 9 0.8-0.9 | 10 0.9-1.0 |
| $doc_1$ | | | X | x | X | | | | | |
| $doc_2$ | | | | | Y | y | y | | | |

Suppose there are 4 documents:

(1) Suppose that search for near-duplicate documents is performed with th=80%, and suppose $\alpha(th)=0.2$; then define $2/\alpha(th)=2/0,2=10$ buckets.

(2) Generate 3 classifiers (1) Define 3 vectors; with 10 buckets each, the buckets are numbered 1-10. Accordingly, by this example, m=3 and n=10.

The ranks (i.e. the results of applying the three functions on the first document are (document_1):

Classifier_1=0.33 (insert to buckets 3,4,5)

Classifier_2=0.44 (insert to buckets 4,5,6)

Classifier_3=0.77 (insert to buckets 7,8,9)

The buckets after insertion document_1 looks like:

| Vector | Buckets | | | | | | | | | |
|---|---|---|---|---|---|---|---|---|---|---|
| | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | | 1 | 1 | 1 | | | | | |
| 2 | | | | | 1 | 1 | 1 | | | |
| 3 | | | | | | | | 1 | 1 | 1 |

The ranks (i.e. the results of applying the three functions on the second document (document_2) are
Classifier_1=0.29 (insert to buckets 2,3,4)
Classifier_2=0.50 (insert to buckets 5,6,7)
Classifier_3=0.81 (insert to buckets 8,9,10)
The buckets after insertion document_2 look like:

| Vector | Buckets | | | | | | | | | |
|---|---|---|---|---|---|---|---|---|---|---|
| | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1 | | | | | |
| 2 | | | | 1, | 1, 2 | 1, 2 | 2 | | | |
| 3 | | | | | | | 1 | 1, 2 | 1, 2 | 2 |

Applying step 39 of FIG. 3 (union) in respect of the first function would result in document_1 and document_2 (the set for the first function) since they share buckets 3 and 4. The set of the second function will also include document_1 and document_2, since they share buckets 5 and 6. Likewise, the set of the third function will also include document_1 and document_2, since they share buckets 8 and 9. The intersection of the sets (in accordance with step 303) would result also in document_1 and document_2 (since they are included in each one of the three sets), and accordingly they are announced as near duplicate.

Moving on to document_3, the ranks of the document_3 are
Classifier_1=0.71 (insert to buckets 7,8,9)
Classifier_2=0.50 (insert to buckets 5,6,7)
Classifier_3=0.81 (insert to buckets 8,9,10)
The buckets after insertion document_3 looks like

| Vector | Buckets | | | | | | | | | |
|---|---|---|---|---|---|---|---|---|---|---|
| | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1 | | 3 | 3 | 3 | |
| 2 | | | | 1, | 1, 2, 3 | 1, 2, 3 | 2, 3 | | | |
| 3 | | | | | | | 1 | 1, 2, 3 | 1, 2, 3 | 2, 3 |

The union step for the first function will yield an empty set, since document_3 does not share any bucket with the previously analyzed document_1 and document_2. Accordingly, it is not candidate for near duplicate to the other documents, since the intersection of the sets is empty (notwithstanding the fact that for functions 2 and 3, the union would result in document_1, document_2, and document_3 included in the respective union sets). Note, incidentally, that had the requirements for determining candidates for near duplicate result would be alleviated, say by requiring that two functions meet the condition, the outcome would be reversed. Put differently, by the latter (alleviated) condition document_3 is announced as near duplicate to document_1 and document_2, since the intersection of the sets for functions 2 and 3 give rise to document_1, document_2 and document_3.

It is accordingly appreciated that the parameters that affect the determination of candidates for near duplicate indication may be configured, depending upon the particular application. Typical, yet not exclusive, example of parameters are the value of δ, the number of functions, etc.

Moving now to document_4, the ranks of the document_4 are

Classifier_1=0.55 (insert to buckets 5,6,7)
Classifier_2=0.55 (insert to buckets 5,6,7)
Classifier_3=0.55 (insert to buckets 5,6,7)

The buckets after insertion document 4 looks like

| | Buckets | | | | | | | | | |
|---|---|---|---|---|---|---|---|---|---|---|
| Vector | 1<br>0.0-0.1 | 2<br>0.1-0.2 | 3<br>0.2-0.3 | 4<br>0.3-0.4 | 5<br>0.4-0.5 | 6<br>0.5-0.6 | 7<br>0.6-0.7 | 8<br>0.7-0.8 | 9<br>0.8-0.9 | 10<br>0.9-1.0 |
| 1 | | 2 | 1, 2 | 1, 2 | 1, 4 | 4 | 3, 4 | 3 | 3 | |
| 2 | | | | 1, | 1, 2, 3, 4 | 1, 2, 3, 4 | 2, 3, 4 | | | |
| 3 | | | | | 4 | 4 | 1, 4 | 1, 2, 3 | 1, 2, 3 | 2, 3 |

As readily arises from the foregoing, document_4 is included with document_1 in the same union set for the first function (since it shares bucket 5 with document_1 and bucket 7 with document_3). Document_4 is included with document document_2 and document_3 in the same union set for the second function (since it shares bucket 5, 6 and 7 with document_1, document_2 and document_3). Likewise, document_4 is included with document_1 for the third function (since it shares bucket 7 with document_1, and document_4). The intersection between the sets (in accordance with step 303) leads to announcing document_4 as near duplicate to document_1.

Note that the mapping of a document to buckets in respect of a given function may be regarded as a non-limiting example for a signature of the document. The signature is short (in terms of the memory space allocated for representing it) and allows for rapid determination of near candidates for duplicate indications. Thus, by the latter embodiment, applying the Union/Intersection operations on the bucket results is efficient in terms of the computation resources, thereby enabling relatively fast calculations in the case that the near duplicate indications need to be determined in respect of large portfolio of documents.

The description above with reference to certain embodiments, exemplified the case where all functions are bound by a certain value. In accordance with certain other embodiments, the functions are bound by different values max, min. For instance, m different functions are applied to a document d, and return m respective values, say $d_{rank\_1}$, $d_{rank\_2}$, ... $d_{rank\_m}$. In accordance with certain embodiments, those m values are inserted to a database, or a specific data structure. When there is a need to get all near duplicate candidates for document x, the corresponding m ranks (for m distinct functions), for this particular document x are calculated, say $e_{rank\_1}$, $e_{rank\_2}$, ... $e_{rank\_m}$. The candidates near duplicate documents d are such that such that $|x_{rank\_i} - d_{rank\_i}| \leq \delta_i(f_i, th)$, where $\delta_i(f_i, th) = \alpha(th) \cdot |max_i - min_i|$ for all $1 \leq I \leq m$ Note that in accordance with certain embodiments of the invention, different min and or max values may apply to two or more out of the m functions.

As readily arises from the description above, it is possible to determine in one cycle of calculation whether a document A is candidate for near duplicate to more than one other document.

In accordance with certain other embodiments, at least one of the functions has a different characteristic. For example the function is not bound by max and min values. For this function type said $\delta(f, th, A) = \alpha(th) \cdot \max f(A)$.

Suppose that there are two functions: The first $f_1$ is the total number of words in a document, and the second $f_2$ is a classifier (ranging from 0 to 1). Suppose document_1 got the following ranks:

| $f_1$ | $F_2$ |
|---|---|
| 200 (words) | 0.63 |

The ranks will be inserted into a table called a Near-DupeTable Document_2 (constituting document A) got the following ranks:

| $f_1$ | $F_2$ |
|---|---|
| 220 (words) | 0.72 |

In accordance with certain embodiments, in order to find all near-duplicate document to document_2, the following SQL query is generated, but first $\delta(f, th, A)$ is set to the following values (for the specific case where $\delta(f_1, th, A) = f_1(A) \cdot \alpha(th)$ and $\alpha(th) = 1 - th$):

- $\delta(f_1, th, A) = f_1(A) \cdot \alpha(th) = f_1(A) \cdot (1-th) = 220*(1-0.8) = 44$. In the case of number of words, this means that we are looking for documents that differ no more then 44 words.
- $\delta(f_2, th, A) = f_2(A) \cdot \alpha(th) = 0.72 * \alpha(th) = 0.1$ ($\alpha$ is a function on the level of equivalence, 0.8 in this case). In this case $\alpha(th)$ may be $\alpha(th) = -0.7*th + 0.7 = 0.14$

```
SELECT documentedD FROM NearDupeTable WHERE (f1 BETWEEN
220 + 44 AND 220 - 44) AND (f2 BETWEEN 0.72 +
0.1 AND 0.72 - 0.1)
```

As a result, document_1 with the respective function values 200 (falling in the range of 220-44 to 220+44) and 0.63 (falling in the range of 0.72-0.1 to 0.72+0.2), will be announced as candidate for near duplicate to Document_2.

Note that the invention is not bound by the specified two function types (i.e. a function bound by the min/max values or a function not bound by the min/max values).

Figure 5:
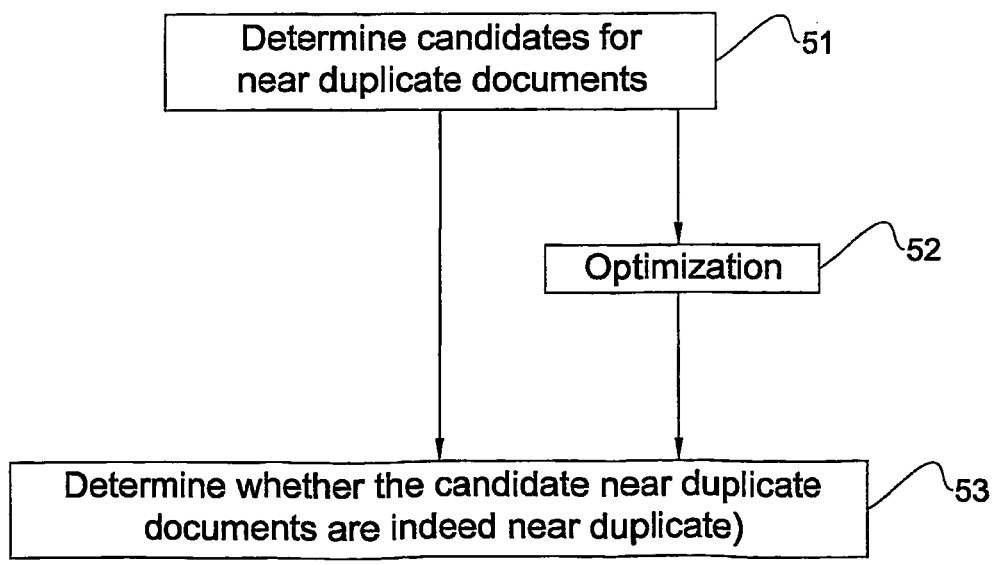
FIG. 5 illustrates a generalized flow diagram of operational stages in accordance with an embodiment of the invention.

Turning now to FIG. 5, there is shown a generalized flow diagram of operational stages in accordance with an embodiment of the invention;

Thus, having determined candidates for near duplicate indication (51) in the manner described in detail above, then in accordance with certain embodiments of the invention, another phase is applied for providing a quantitative indication (more finely tuned) on the extent of proximity between the documents (which, in certain embodiments, calls for determining whether the candidate near duplicate documents are indeed near duplicate) (52). To this end, a resemblance criterion between the candidates near proximate documents will be used and in the case that said criterion is met, the documents are announced as candidates for near duplicate.

For example, in accordance with certain embodiments, a known per se measure for determining resemblance, such as the one disclosed in U.S. Pat. No. 5,909,677 Broder (disclosing a technique for resemblance of documents), may be used. Note that this approach is resource consuming (in terms of computational resources), however it is applied, preferably, only to those documents classified as candidates for near duplicate indication in accordance with the embodiments described above (e.g. the one described with reference to FIGS. 3 and 4).

The fined tuned determination in accordance with e.g. the Broder measure, is determined by applying intersection between the candidate documents divided by union thereof meet a certain threshold (constituting by this example said resemblance criterion). By one example, the intersection is determined by calculating the number of shingles that are shared by both documents, and the union is determined by the number of shingles that reside in either documents. Thus, for instance, if the first document has 200 shingles and the second has 250, and it turns out that 100 shingles are shared by both documents, whereas the number of shingles that reside in either or both of the documents is 300, then the documents are near duplicate in 33.3%. It may be determined, for example, that only those documents having shared shingle portion that exceed a given threshold are classified as near duplicate.

Note that the invention is not bound by the specified Broder measure, for the second phase of calculation.

Thus, in accordance with one embodiment, if a resemblance criterion stipulates that documents need to be near duplicate in 90%, a first phase would lead to documents which are candidates for near duplicate (as described, e.g. with reference to certain embodiments of FIG. 3) and then a second phase would apply a more fine tuned (by one embodiment, slower) analysis in order to determine which documents (from among those announced as candidates for near duplicate indication in the first phase) are near duplicate at the desired extent (by this example 90%).

A certain optimization (52 in FIG. 5) may be applied in order to expedite the second phase. Thus, in accordance with certain embodiments, this optimization would ignore those documents with shingle ratio that drops below the desired extent of near proximity. For instance, if the requirement for near duplicate is 90% and a certain document has 200 shingles, whereas the other has 250 shingles, the need to calculate the tedious intersection divided by union step is obviated, since the ratio between the shingles is 0.8 (80% being lower than the desired level of 90%). In the context of FIG. 5, those documents which were discarded in the optimization stage (52), will not be subject to the subsequent more fine tuned analysis of verifying the documents that are near duplicate (53).

Note that certain documents which may be announced as candidates for near duplicate in the first course calculation phase, may eventually turn out to be not near duplicate if they do not meet the fine tuned quantity test, of the kind described, by way of example only, above.

In accordance with yet another embodiment of the invention, the system is characterized in learning capability. Thus, by a non-limiting example, a new function is used; say by way of non-limiting example, a classifier.

As may be recalled, a classifier distinguishes between two groups of documents, the two opposite training groups accommodate documents which were classified as near duplicate in the first phase, but did not meet the second more fine tuned phase. This situation may happen in certain cases where the first phase failed to duly identify near duplicate documents. For example, if the first phase determined that documents 1 and 2 are candidates for near duplicate, but it turns out that they are not classified as near duplicate in the second phase, then document 1 would be included in the first group and document 2 in the second group. If another pair, say document 5 and 8 have similar fate, then document 5 is added to group 1 (together with document 1) and document 8 is added to group 2 (together with document 2). Based on the two groups, a new classifier is generated. If the system includes i classifiers and near duplicate indication is provided if the documents meet the condition for every one of the i classifiers, then in accordance with this embodiment, the newly generated classifier constitutes the i+1's classifier. Since however the latter signifies documents which succeeded to meet the candidate for near duplicate test of the first phase and failed to meet the near duplicate test of the second phase, any new document which meets the condition for the i+1 classifiers, has a better likelihood to meet also the second more fine tuned test, thereby improving the quality of the results obtained by the first coarse (and fast) test.

In accordance with a more generalized approach of certain embodiments of the invention, there is provided applying at least one additional calculation phase in order to determine whether candidates of near duplicate documents meet a criterion for near duplicate documents, and applying a learning phase based on documents that are determined to be candidates for near duplicate, but did not meet the criterion for near duplicate documents.

The invention has been described with reference to certain embodiments by employing the condition $|f_i(A)-f_i(B)|\leq\delta_i(f,\text{th},A)$, where $\delta_i$ is dependent upon at least $f,\text{th},A$.

In accordance with certain other embodiments, the following condition was employed, $|f_i(A)-f_i(B)|\leq\delta_i(f,\text{th})$, where $\delta_i$ is dependent upon at least $f,\text{th}$.

In accordance with certain other embodiments the following condition was employed, $|f_i(A)-f_i(B)|\leq\delta_i(f,A)$, where $\delta_i$ is dependent upon at least $f,A$.

(1) The invention is not bound by these specific embodiments. Thus, in accordance with a broader aspect of the invention, there is provided a system and method for determining that at least one object B is a candidate for near duplicate to an object A, comprising: providing at least two different functions on an object, each function having a numeric function value;

(2) determining that at least one object B is a candidate for near duplicate to an object A, if a condition is met, the condition includes: for any function $f_i$ from among said at least two functions, a relationship between results of the function when applied to the objects meets a given score.

In accordance with some of the embodiments described above, said relationship being $|f_i(A)-f_i(B)|$, and said score being $\delta_i(f,A)$, wherein $\delta_i$ is dependent upon at least $f$ and A, and wherein said condition is met if $|f_i(A)-f_i(B)|\leq\delta_i(f,A)$. In accordance with certain other embodiments described above, said score being $\delta_i(f,\text{th})$, wherein $\delta_i$ is dependent upon at least $f$ and th, and wherein said condition is met $|f_i(A)-f_i(B)|\leq\delta_i(f,\text{th})$.

In accordance with certain other embodiments described above, said score being $\delta_i(f,\text{th},A)$, wherein $\delta_i$ is dependent upon at least $f$ th and A, and wherein said condition is met if $|f_i(A)-f_i(B)|\leq\delta_i(f,\text{th},A)$.

Having described various embodiments for determining near duplicate documents in accordance with various embodiments, there follows a description of masking noise features in (noisy) documents for determining near duplicate documents. As specified above, for convenience only the description will refer occasionally to near duplication determination techniques described above, which is by no means binding and other techniques to check similarity are applicable.

For convenience, the description will occasionally refer to features in a form of words. This is however not binding.

For convenience, the description will refer to documents but this is by no means binding and the invention applies to other forms of objects. For convenience, the invention will also refer to noise features introduced by translation tools such as OCR, but this is by no means binding.

In accordance with certain embodiments, and as will be described with greater detail below, translated documents are not mapped to words having a dictionary meaning (and therefore being language independent). The glossary that serves for masking noise features in the documents does not include a dictionary that pertains to a natural language in which said document is written.

Thus, in accordance with certain embodiments, if a feature (say a word) appears in a first document and a feature (say a word) appears in a second document, then if the words are close enough (in accordance with a certain criteria) both (different) words will be mapped to the same word, (not necessarily readable).

For instance, assume that a "real word" appearing in a paper is having. The paper is digitized and translated (using say, OCR) and the word having gets the form havint (due to an OCR error). Further assume that there is another document having the word having that was digitized and translated (say, using another or the same OCR) to get the form havinw (again due to an OCR error). Assuming that the close enough criterion requires 1 letter difference (havint is different in one letter from havinw). Then, in accordance with a certain embodiment of the invention, both words will be mapped to, say the form havinj. The latter word has no dictionary meaning (and the masking did not consult a dictionary) but the different translated words (havint and havinw) get a common form of havinj. Now, if the masked documents are fed to a near-duplicate identification technique (typically, although not necessarily, in accordance with that described in detail above), then the prospects of detecting a near duplicate result are increased, since the errors introduced by the translation tool are neutralized.

There follows a list of definitions of terms used in accordance with certain embodiments of the invention. The definitions are provided for clarity only and are by no means binding.

In accordance with certain embodiments, extracted document is a noisy document. The noise is introduced to the documents e.g. by a translation tool such as an OCR tool.

In accordance with certain embodiments, the edit distance between two features s1 and s2 (say words), is defined as the minimum number of operations to become the same (Levenshtein1965). It gives an indication of how 'close' or 'similar' two features are. The edit distance is a non limiting example to determine if a feature is close to another feature. By this example the predefined criterion to determine if feature is close to another feature would be if the edit distance value is equal to (and/or smaller than) a certain value.

The Feature Mapping Function (FMF) gets a feature (being e.g. "bag of words", "shingle"), and returns a feature. Thus, in accordance with certain embodiment, the FMF function is calculated as follows:

given two documents Doc_1, and Doc_2.
A) Apply LCS algorithm on the words of the two documents, and find the longest common substring.
B) Take Doc_1 and the computed LCS, and insert all differences to a vector Diff_1_LCS. Note that the first difference will be in entry Diff_1_LCS [0], and so on.
C) Take Doc_2 and the computed LCS, and insert all differences to a vector Diff_2_LCS. Note that the first difference will be in entry Diff_2_LCS [0], and so on.
Note that the sizes of the vectors are the same.
D) For each entry i in Diff_1_LCS, and Diff_2_LCS
E) Find the edit distance between Diff_1_LCS[i] and Diff_2_LCS[i], If the Edit distance is smaller than a given value (say 2) add an entry in the FMF function such that FMF(Diff_1_LCS[i])=FMF(Diff_2_LCS[i])

For a better understanding of the foregoing, consider the following example:
Consider two documents:
Doc_1: The boy x and his dog go to school every day
Doc_2: The b0y and his cat go to school every dai pp. The LCS of the two documents is (A):
LCS: The_and his_go to school every_
The vector differences between Doc_1 and the LCS is: (step B)
Diff_1_LCS [0]=(boy x)
Diff_1_LCS [1]=(dog)
Diff_1_LCS [2]=(day)
Diff_1_LCS [3]=( )
The vector differences between Doc_2 and the LCS is: (step C)
Diff_2_LCS [0]=(b0y)
Diff_2_LCS [1]=(cat)
Diff_1_LCS [2]=(dai)
Diff_2_LCS [3]=(pp)
Loop on all entries (step D):
EditDistance (Diff_1_LCS [0], Diff_2_LCS [0])=EditDistance((boy x), (b0y))=3; don't add (since edit distance is not smaller than 2)
EditDistance (Diff_1_LCS [1], Diff_2_LCS [1])=EditDistance ((dog), (cat))=3; don't add (since edit distance is not smaller than 2)
EditDistance (Diff_1_LCS [1], Diff_2_LCS [2])=EditDistance ((day), (dai))=1; add the value "dai" (since edit distance is smaller than 2). Thus, whenever "day" is encountered (in corresponding locations), it will be mapped to "dai". Note that in the specific example that utilizes the Diff_LCS structure, the mapping will occur if the words appear in the same place in Diff_1_LCS and Diff_1_LCS.
EditDistance (Diff_1_LCS [2], Diff_2_LCS [3])=EditDistance (( ), (pp))=2; don't add (since edit distance is not smaller than 2).

While for convenience, the description below refers to FMF, it should be noted that FMF function is only an example of mapping between features in noisy documents to other features which are common to different documents for the purpose of masking the errors in the noisy documents and thereby eliminating their effect when using various applications, such as near duplicate application.

For instance, in the latter example, suppose that document translation leads to the word 'havinw' instead of the word 'having', and the word 'havint' instead of the word 'having'; Using FMF definition FMF(havinw)=FMF(havint)=avinj, since havinw and havint both originated from the word having. Note that havint and havinw are features whereas havinj is the mapped feature.

Note that in accordance with certain embodiments, the FMF function does not require reference to the features. For instance it may not require a dictionary. Thus, in the context of finding near-duplicate among noisy documents (or an exact duplicate), it is not important if the "mapped" word is in a natural language such as English, or comes from a pre-define dictionary such as list of places, etc. Therefore, in accordance with certain embodiments, FMF function can map features to features which are not necessarily part of a natural language such as English. Accordingly, in accordance with certain embodiments, the masking of noisy documents for the purpose of determination of near duplicate documents can be language independent.

In accordance with certain embodiments, Doc_FMF(Extracted document) is a set of features that was generated by applying FMF function on all the features of the extracted document.

Note that the invention is not bound by the specified Feature Mapping Function and/or by the specified edit distance function.

Having provided a few definitions in accordance with a certain embodiment, there follows a description of a generalized sequence of operation, in accordance with an embodiment of the invention. Thus, a Near Duplication technique is applied to a corpus of documents (stored in a repository) for finding similar documents. The level of similarity can be determined in advance. The Near Duplicate techniques can be for example as described in detail above. The resemblance determination may be for example the one taught by U.S. Pat. No. 5,909,677 (Broder), by calculating intersection between documents divided by union between the documents. This resemblance technique for determining similarity level, is by no means binding.

This however is not binding and other known per se techniques may be used.

Having determined sufficient near duplicate documents, noise features are masked and the similarity level between the documents can be improved using resemblance determination technique(s), as will be described in greater detail below.

To this end, or possible other purposes, a dynamic glossary operable to mask noise features in documents is constructed, as will be explained in detail below.

In a generalized form the construction of the glossary includes:

a method for constructing a glossary operable to mask noise features in at least two documents that are similar in accordance with a criterion; the noise features being nominally identical features that appear differently in the documents, the method comprising:
  a) providing a discrepancy list for the at least two documents that includes the noise features; and
  b) constructing a glossary for masking the noise features utilizing at least the discrepancy list.

Note that the discrepancy list is not bound to any specific form and may include the noise features or any indication thereof (e.g. coded features).

In accordance with a specific embodiment the construction of the glossary includes utilization of Feature Mapping Function (FMF), as will be explained in detail below.

The invention is not bound by the specified generalized sequence of operation.

Figure 6:
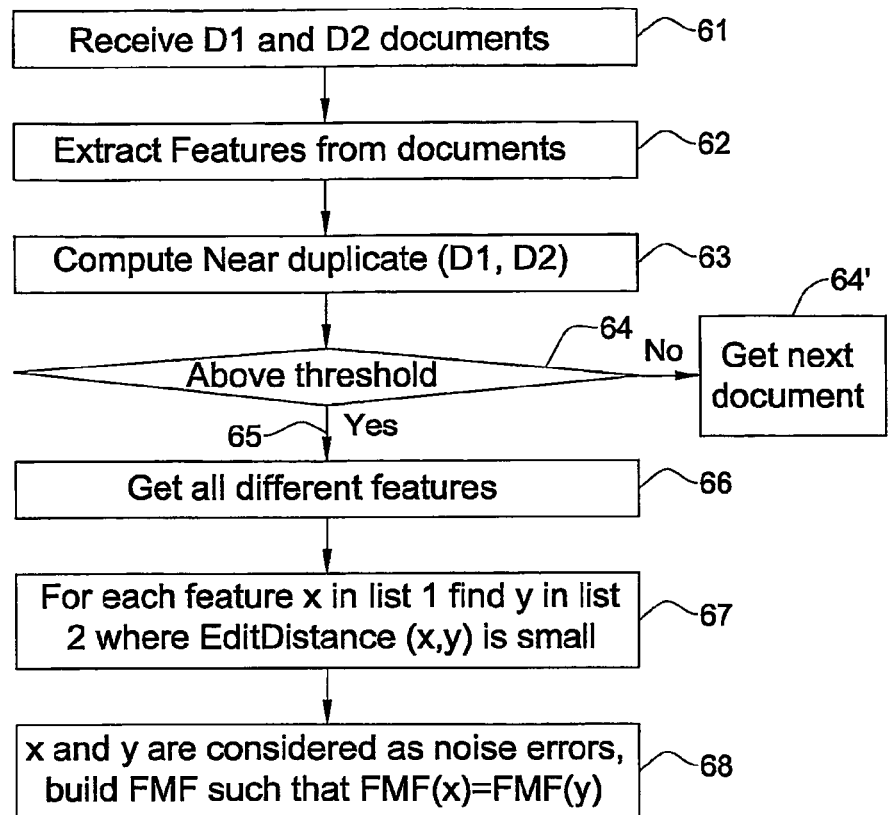
FIG. 6 illustrates a flow diagram for constructing a Function Mapping Function (FMF) in accordance with an embodiment of the invention.

Bearing this in mind, there follows a description of calculating FMF function, in accordance with certain embodiments and with reference to FIG. 6.

In accordance with certain embodiments, FMF can be implemented as a lookup table being an example of a glossary. Start with an empty lookup table.

(61) Given two documents D1 and D2
(62) Extract their features
(63) Compute Near Dup(D1,D2)
(64, and 65) If above threshold (TH) (say 85%), otherwise get next document 64'
(66) Get all features that are:
  in D1 and not in D2: list1
  in D2 and not in D1: list2, wherein list1 and list2 constitute an example of discrepancy list. Respective pairs in list1 and lists illustrate nominally identical features which appear differently.
(67) For each feature x in list1, find y in list2 where EditDistance(x,y) is smaller then X (for example X=2)
(68) For all such x and y; they are considered as OCR features errors, and the system adds an entry to the FMF table FMF(x)=A, where A is a common mapped feature being FMF(y) if FMF(y) exists and y otherwise.

As shown, steps (61)-(65) are in fact the process described above for identifying similar documents. Having identified similar documents there follows step (66) of: Get all different features i.e. features that are
  in D1 and not in D2: list1
  in D2 and not in D1: list2

In the example above and assuming that features are words, the word havinw (belonging to D1 but not to D2) can be in list1 and havint (belonging to D2 but not to D1) can be in list2. havinw and havint are nominally identical words (both apparently should read "having" which, as shown, appear differently, e.g. due OCR error.

Other words appearing in D1 and not in D2 are included in list1 and vice versa words appearing in D2 and not in D1 are included in list2, where list1 and list2 constitute a non limiting example of discrepancy list.

In accordance with certain embodiments, in order to build list1 and list2, an algorithm is applied to find Longest Common Subsequence (LCS) between the two documents. The LCS finds the longest sequence which is a subsequence of all sequences in a set of sequences. For example: Suppose D1 is: "A boy went to school", and D2 is: "A boy went t0 school", then the LCS of D1 and D2 is "A boy went school", and the difference is "to", and "t0".

It should be noted that the size of list1 and list2 is relatively small since a priori the documents are near duplicate (due to the preliminary processing steps 1-4) and accordingly, major parts of the documents are identical.

Now the EditDistance criterion is used (as a non limiting example to determine whether the features are close in accordance with predefined criterion), of particular interest are words of, say distance 1 (67) where the latter exemplified a predefined criterion. For example, the words havinw and havint are such words which are distinguished one with respect to the other by only one letter. It is therefore assumed that these words originate from the same source and were corrupted by the translation (OCR) process (for the particular case that the noise stems from OCR errors). These words will be masked by the FMF function (see step 68) by mapping them to a common feature. This was exemplified above such that FMF(havinw)=FMF(havint)=FMF(havinj.)=havinj. Note that the masking is performed without actually knowing the original meaning of the word, (i.e. having), without using any natural language dictionary. The "common value" by this example havinj is only an example and any common value can be used.

The specified procedure can be implemented, e.g. using a lookup table T where T(havinw)=T(havint) is to be replaced in both cases by havinj. Note, that implementation with a lookup table is just an example of a glossary. In accordance with other embodiments, a glossary may be for example a known per se form of database arrangement and/or contents. For convenience only the embodiments below are described with reference to a table.

The procedure described above is implemented for all corresponding close words ("close" in this non limiting example is distance=1). By following this approach, a repertoire of corresponding words that (are suspected to be corrupted by translation tools) are identified and masked (i.e. mapped to common words). This repertoire of words would constitute an exemplary implementation of the mapping function FMF. Note that words that do not meet the EditDistance criterion (i.e. their distance is more than 1) will not be treated (in step 68), since it is assumed that they are "real different" words that were not corrupted by OCR. Thus for example if the word "Dean" appears in list1 and the word "Dell" appears in list2, they will not be subjected to mapping since their distance is 2 (see underlined letters in the respective words) and this indicates that they are real different words and not results of translation errors.

Note that the FMF may erroneously map what seems to be nominally different features which in reality are different. For instance, bed and bad appear in corresponding locations in D1 and D2, whist indicating true different words may be "captured" by the EditDistance function and, since they are different by only distance 1 and assuming that they appear in corresponding locations. In accordance with certain embodiments, in order to cope with the foregoing, a natural language dictionary can be used to override mapping of seemingly noise features if both features appear in the dictionary.

Note that the description of the specified algorithm for calculating FMF is provided as an example only and is by no means binding. Likewise the example of distance 1 is by no means binding.

Figure 7:
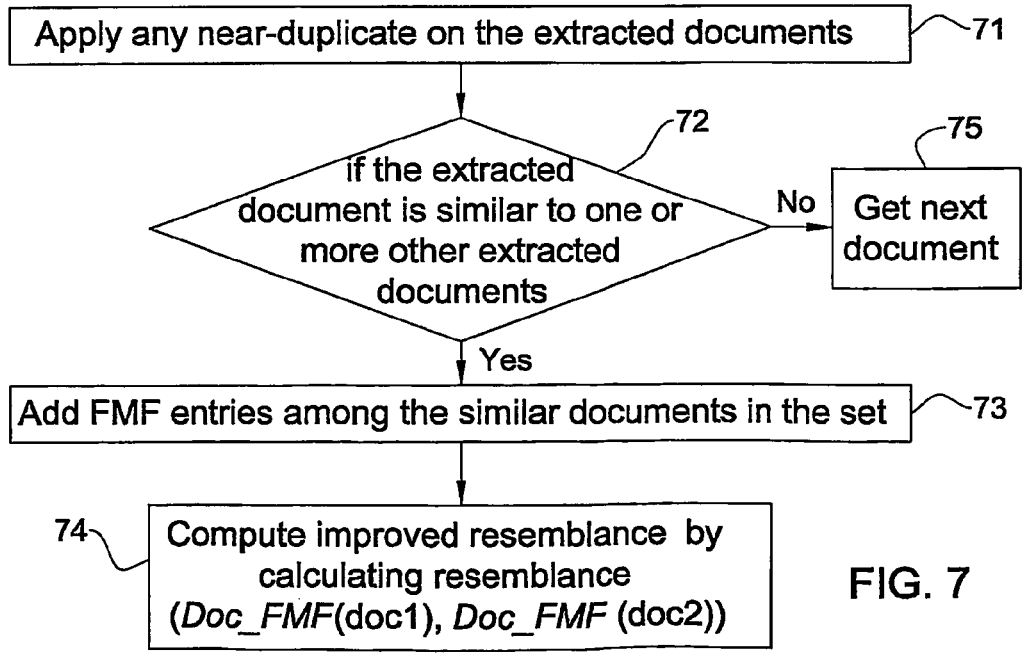
FIG. 7 illustrates a flow diagram of a sequence of operation for determine near duplicates among noisy documents, in accordance with an embodiment of the invention.
Figure 8:
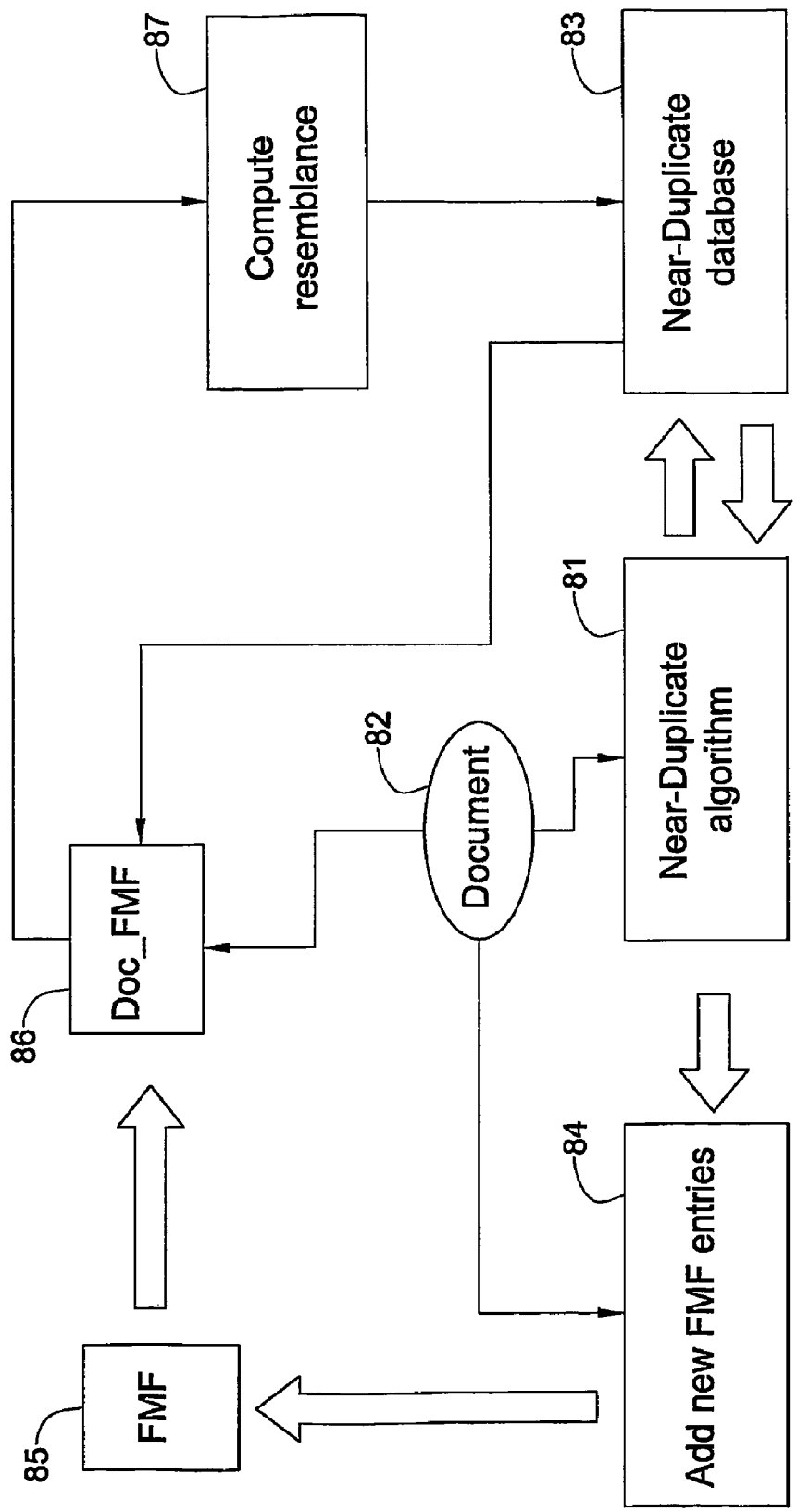
FIG. 8 illustrates a system architecture in accordance with an embodiment of the invention.

Having calculated the FMF function in accordance with certain embodiments, there follows a description of a manner of operation in accordance with an embodiment of the invention. This will be described with reference also to FIG. 7 illustrating a flow diagram of a sequence of operations for determining near duplicates among noisy documents, in accordance with an embodiment of the invention, and with reference to FIG. 8 illustrating a system architecture, in accordance with an embodiment of the invention.

Thus, in accordance with certain embodiments, the documents are subjected to being candidates for near duplicate (71), e.g. using the technique described with reference to steps 51 of FIG. 5. Next (72), in the case of sufficient level of similarity, FMF entries are extracted 73 from the similar documents utilizing discrepancy list, e.g. in accordance with steps 66 to 68, of FIG. 6 giving rise to new entries that are entered to the glossary. In order to improve the level of similarity, the following step (74) is applied: resemblance (Doc_FMF(doc1), Doc_FMF(doc2)) to determine if doc1 is near duplicate to doc2. This calls for activation of the FMF function discussed above which will map all the OCR related errors (e.g. replace havinw by havinj and havint by havinj). Accordingly in both documents the word havinj will appear. Now applying the resemblance function on the masked document (in 74) will give a better indication on the real difference (or similarity) between the documents, whilst eliminating the undue noises in the documents. More specifically, the word havinj will not form part of the "difference" between the documents (since it appears in both of them), thereby providing a more accurate result and neutralizing the OCR error-prone translation effect.

Note that the resemblance determination (in 74) does not necessarily require to operate the entire near duplication procedure, but only the resemblance, e.g. in accordance with certain embodiments, calculating resemblance by calculating intersection between the documents divided by the union between the documents, as discussed above with reference to step 303.

Thus, as a result of having masked suspected OCR noise, a document that was near duplicate without improvement may now be:

A near duplicate but with a higher and more reliable similarity %, or

An exact duplicate. The latter scenario applies for the case of exact documents which were contaminated by noise, e.g. OCR introduced errors.

Attention is now drawn to FIG. 8, illustrating a system architecture applicable in accordance with certain embodiments of the invention. As shown, the system 80 includes a near duplicate module 81 capable of receiving input document(s) 82 and determining which are near duplicate (e.g. in accordance with steps 71 and 72 of FIG. 7). The near duplicate document can be stored in repository. Having obtained near duplicate documents, new FMF entries can be added to the glossary using add new FMF entries module 84, storing the new FMF entries in FMF database 85 (exemplifying one form for storing the glossary). This includes determination of discrepancy list and utilizing it (see 73, above).

The addition of new FMF entries was also discussed in detail with reference to FIG. 6. As further shown in FIG. 8, a DOC_FMF module 86 is coupled to the FMF entry table 85 and is configured to receive the input document(s) 82 and candidate near duplicate documents (e.g. extracted from the near duplicate database 83) and apply the DOC_FMF function to the document (82) and the documents as extracted from database 83, e.g. as described with reference to step 74, above. Note that the DOC_FMF function may utilize the glossary in database 85 after having been enriched by new entries that were automatically added thereto as a result of comparing the near duplicate documents that were identified in module 81 (and the new entries were added to the database 85 by FMF new entries module 84). Next, improved resemblance 87 is calculated on the masked documents (e.g. resemblance(DOC_FMF(DOC1), DOC_FMF(DOC2)), where DOC1 being the tested document 82 and DOC2 being any of the candidate documents extracted from near duplicate repository 83. The resulting documents with the improved resemblance level (after having masked the noise features) are stored in the near duplicate repository 83.

The improved resemblance calculation was described with reference to step 74 above.

The net effect of applying the masking technique in accordance with certain embodiments of the invention, is that noise features introduced e.g. by an OCR can be masked and as a result the similarity level between near duplicate documents is likely to increase compared to a situation where these errors are not masked.

Note that in accordance with certain embodiments, there is more than one glossary being used (which may be stored in the same or different databases). Thus, by way of non-limiting example, a distinct FMF entry table may be used for respective OCR device or family of devices. The underlying logic is that different OCR devices generate respective different typical OCR errors and therefore a glossary per given OCR device (i.e. include mapped words of noises introduced by this particular OCR device) may better identify noise features characterizing this particular OCR device. By this embodiment, the specified glossary will not be used to mask noise features in documents that were subjected to different OCR device(s) which may have different characterizing errors. Note that in accordance with this embodiment, to the extent that the near duplicate data repository 106 stores documents that were OCR scanned, there needs to be an indication from which OCR device they originate.

This example is of course not binding and other criteria may be applied for using two or more FMF entry tables.

The invention not bound by the specified architecture or any specific implementation. For example database module 5 can be implemented in any known per se manner.

The invention is, of course, not bound by the use of near-duplicate technique as depicted and described above, and accordingly other known per se techniques may be used. The invention is likewise not bound by the use of the FMF built procedure and the application thereof described with reference to FIGS. 6 and 7, as well as the system architecture of FIG. 8.

For a better understanding of the foregoing, there follows a non-limiting example of implementing the technique for determining near-duplicate among noisy documents in accordance with the procedure described with reference to FIGS. 7 and 8, above. Consider, for example, four documents that were digitized and subjected to OCR. The changes (generated by the noise) introduced during the process are marked (for convenience) with an underline:

Doc1: The boy and his dog go to school every day.
Doc2: The b0y and his cat go to school every day.
Doc3: The b0y and his d0g go to schol every day.
Doc4: The b0y and his ca1 g1 to scool every day.

If a near duplicate technique is applied to the documents, using for example one of the embodiments described with reference to FIGS. 2-5, the following results are obtained:

|  |  | Similarity Level |
|---|---|---|
| Doc1 | Doc2 | 80% |
| Doc1 | Doc3 | 70% |
| Doc1 | Doc4 | 60% |
| Doc2 | Doc3 | 80% |
| Doc2 | Doc4 | 70% |
| Doc3 | Doc4 | 70% |

Table 1: Similarity Level Between Documents Before any Improvement

Thus, for example, Doc1 is similar to Doc 2 at 80%, since each document includes 10 words and there are two words (2 out of 10=20%) which are different, namely "dog" vs. "cat" and "boy" vs. "b0y". All the other pairs of documents are similar one with respect to the other by the similarity level specified in the "similarity" column.

In accordance with certain embodiments, a document similarity set is used, defining level of similarity between respective documents. By way of non-limiting example, a document similarity set referred to for convenience as EquiSet(TH %) notation is used. An EquiSet(TH %) is a set of documents such that a document is a member in the set if exists another document in the set, such that the similarity level between the two documents is at least TH %.

For example an EquiSet(80%) for the specified four documents in as illustrated in Table1 will be: (DOC1, DOC2, DOC3). DOC4 is not in this EquiSet(80%) as its similarity to all other documents is less than 80%. As specified above, in order for a document to reside in the same Equiset with other two or more documents it is enough for identifying documents which reflect different generations of a given pivot document.

For instance, assume that TH % is 80%. If a pivot document (A) is slightly changed to a first version by say 10% (giving rise to 90% similarity level) then the first version (B) is similar to the pivot document by at least the 80% and therefore resides in the same Equiset. Assuming now that document B had undergone further revisions, giving rise to a second version (C) which is 85% similar to the first version by only 75% to the pivot document. Document (C) is similar by at least 80% to document B and therefore belongs to the same Equiset. Document (C) is in the same Equiset as the pivot document (A) although it is similar thereto by only 75% (below the specified 80%). The underlying logic here is that it would be interesting to "maintain the link" between document C and A (despite the lower level of similarity between the two) since C is a version of A (linked though earlier version B), and therefore for many practical applications, maintaining all the versions in the same group (e.g. the same Equiset), is advantageous.

Turning now to apply the procedure described, for example, with reference to FIG. 7, the first improvement will enhance the similarity level within EquiSets but will not insert new documents to any EquiSet). Therefore, the similarities within the EquiSet (DOC1, DOC2, DOC3) are improved, and DOC4 will remain in its Equiset.

Thus, at the onset, a Near Duplicate detection (71 and 72) is applied giving rise to the similarity level results as set forth in Table 1, above.

Next, new FMF entries (73) are automatically added to the glossary. In accordance with a certain embodiment this calls for getting all the different features for each pair of documents (66 in FIG. 6). For instance, the different features are in Doc 1 and not in Doc 2 [constituting list1] and are in Doc 2 and not in Doc 1 [constituting list2], both lists constituting a non-limiting example of discrepancy list. The different features are arranged in accordance with correspondence criterion, e.g. by EditDistance value in a descending order. For any corresponding feature which meets a certain criterion, say EditDistance=1 (67), an FMF entry is built (68), to bring the corresponding features to an identical value. This is also illustrated in modules 84 and 85 in the system architecture of FIG. 8.

Thus, the building of new entries (step 73 and modules 84) are shown in Table 2 (below), the words "boy" (in Doc1) and "b0y" (in Doc 2) which are spaced apart by a distance of 1 are subjected to FMF function, giving rise to a common value of "b0y". The words "dog" and "cat" are spaced apart by a distance of 3 and therefore do not meet the EditDistance criterion and are therefore considered as real difference and not as noise.

In respect of Doc2 and Doc3, the words "cat" and d0g" are considered real difference, since their distance is 3, beyond the required EditDistance value 1, and the words "school" and "schol" are having EditDistance of 1 and therefore are added as a new entry ("schol").

TABLE 2 constructing entries in the Glossary

| Document pair | Differences found | Edit distance | New entries in FMF function |
|---|---|---|---|
| | Inserting Doc1 - No candidates | | |
| | Inserting Doc2 - candidate Doc1 (similarity 80%) | | |
| Doc1, Doc2 | (boy, b0y) | 1 | FMF(boy) = b0y |
| | (dog, cat) | 3 | |

TABLE 2-continued constructing entries in the Glossary

| Document pair | Differences found | Edit distance | New entries in FMF function |
|---|---|---|---|
| | Inserting Doc3 - candidate Doc2 (similarity 80%) | | |
| Doc2, Doc3 | (cat, d0g) | 3 | |
| | (school, schol) | 1 | FMF(school) = schol |
| | Inserting DOC4 - No candidates | | |

Note, incidentally, that the application of the FMF function did not necessarily require a natural language dictionary, and the replaced value does not necessarily constitute a meaningful word in English language (e.g. "schol").

The features that met the specified criterion are deemed noise which would then (at a later stage—74) be masked by applying the FMF function which will bring the different features to a common mapped value.

Thus, reverting to FIG. 7, after having generated FMF entries (as exemplified in Table 2), there follows the step of computing improved resemblance within an EquiSet by calculating "resemblance (Doc_FMF(doc1), Doc_FMF (doc2))" (step (74) as well as modules 86 and 87 of FIG. 8). More specifically, the DOC_FMF function will mask nosie features in the noisy documents using also the newly generated FMF entries (see Table 2 and after having mapped the specified features in the documents a resemblance technique will be applied to obtain (optionally) better similar documents, or in certain scenarios also identical documents. The resemblance technique can be for example application of intersection/union, discussed above.

This would lead to the following results:
Doc1: The b0y and his d0g go to schol every day
Doc2: The b0y and his cat go to schol every day
Doc3: The b0y and his d0g go to schol every day
Doc4: The b0y and his ca1 g1 to scool every day Note, for instance, that in Doc1, the word "boy" was replaced by "b0y" and in Doc3 the word "school" was replaced by "schol", as per the existing FMF entries.

After having replaced the words by corresponding FMF entries, and applying a near duplicate detection algorithm, the following results are obtained as depicted in the following Table 3:

TABLE 3

Similarity level between documents in the same EquiSet

| | | | Similarity |
|---|---|---|---|
| Equiset_1 | Doc1 | Doc2 | 90% |
| | Doc1 | Doc3 | 100% |
| | Doc2 | Doc3 | 90% |
| Equiset_2 | Doc4 | | |

Taking for example Doc1 and Doc 2, they are now 90% similar, since the only difference is the word "cat" vs. "d0g" whereas the other 9 words are identical. Note also that the improved level of similarity (90%) over the previous level of similarity 80% between Doc1 and Doc2 stems from the fact that a previous change between the documents in the words "dog" vs. "d0g" was identified as a noise (say OCR) introduced error. This noise has been masked by applying the FMF function giving rise to the word "d0g" in both documents. As shown Doc4 is similar to Doc1 by 70%, to Doc2 by 70% and to Doc3 by 70% and therefore is not a member in the Equiset (80%) that accommodates Doc1, Doc2 and Doc3. As noted, by this specific embodiment, the documents were maintained in the same Equiset, however, the similarity level is improved (as arises from Table3 compared to Table1).

In accordance with certain other embodiments, OCR errors are masked before applying the Near Duplicate to the documents and the likelihood of finding more near duplicate documents or improving the level of similarity increases. Thus, with reference to FIG. 9, the following is performed:

91. Start with a pool of documents, and an empty FMF function
92. While there are unprocessed documents Do
93. Take a document DOC, and mark it as processed
94. Compute Doc_FMF(DOC) thereby masking features in the document using calculated FMF
95. Apply a near-duplicate algorithm on Doc_FMF(DOC), and get a set of candidate documents C1, C2, . . . , Cn.
96. For all candidate documents Ci Do
    (a) Calculate resemblance(Doc_FMF(DOC) Doc_FMF (Ci); if above TH then
    (b) Add new FMF entries among close enough features in the set;
    (c) Add Ci to the EquiSet of DOC.
97. End For
98. End While In accordance with these embodiments, the OCR oriented errors are filtered out before the near-duplicate procedure is invoked.

As a result, documents that were not considered as candidate before, now become candidates.

Figure 9:
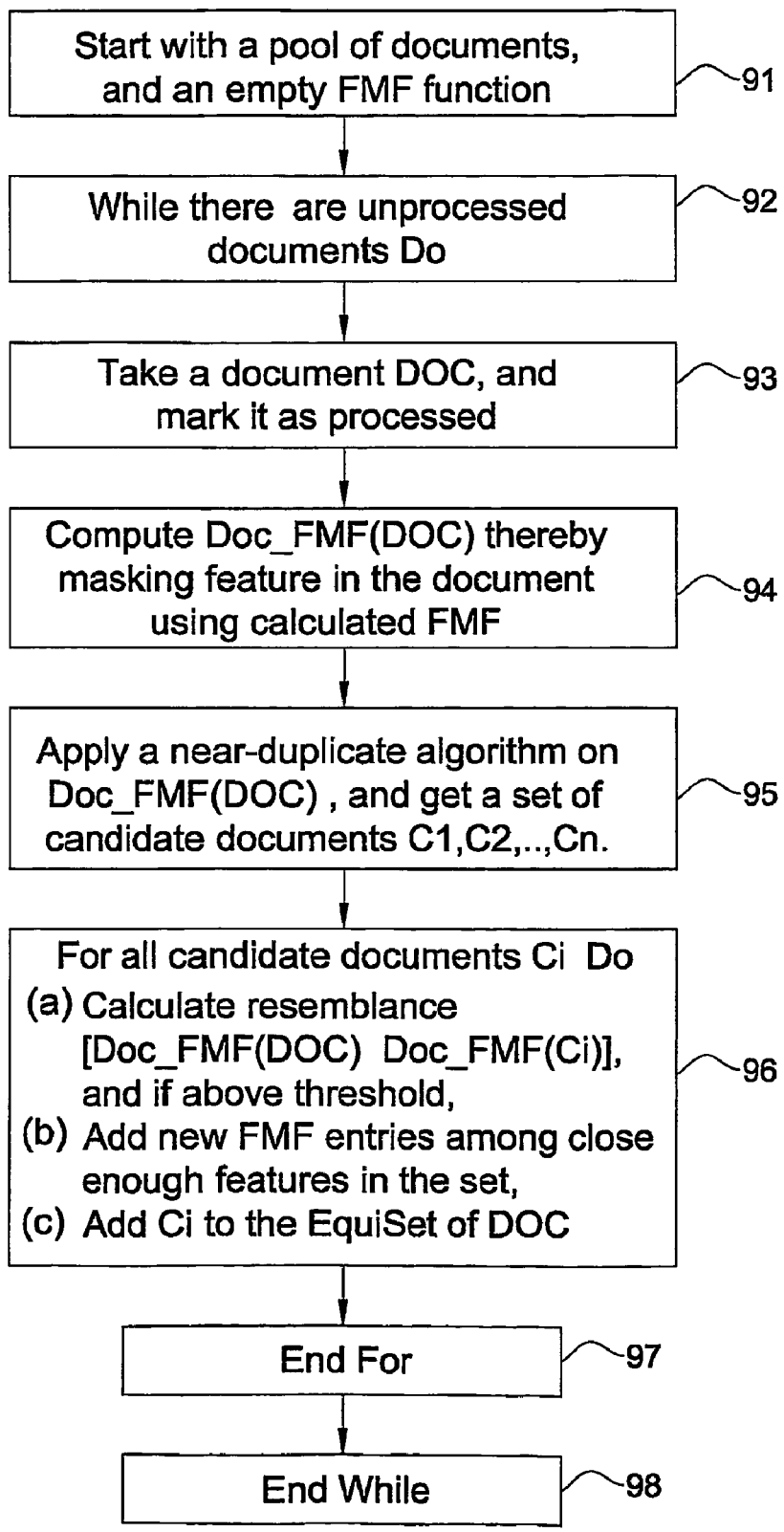
FIG. 9 illustrates a flow diagram of a sequence of operation for determine near duplicates among noisy documents, in accordance with an embodiment of the invention.

The invention is, of course, not bound by the specified sequence of operation with reference to FIG. 9.

In accordance with certain embodiments there flows a method for determining whether at least one masked document A is a candidate for near duplicate to a document B; at least two of said documents include noise features being nominally identical features that appear differently in the documents; the method comprising:

(a) maintaining (i) a glossary configured to map noise features to common mapped features, and (ii) a repository storing masked documents A;

(b) utilizing the glossary, for said document B, for masking noise features, if any, by mapping said noise features into common mapped features, giving rise to masked document B;

(c) applying a near-duplicate technique to the masked documents, for determining at least one masked document A that is candidate for near duplicate to the masked document B;

(d) for each one of at least one of said candidate documents A,
    (i) utilizing the glossary, for said candidate document A and masked document B, for masking noise features, if any, by mapping said noise features into common mapped features, giving rise to masked documents;
    (ii) determine resemblance between said masked documents; and above threshold,
    (iii) identifying, in said document and masked document B, at least one pair of noise features, if any, which do not appear in the glossary, and in respect of each pair, mapping said pair of features to a respective common mapped feature and automatically adding said mapped feature to the glossary.

Figure 10:
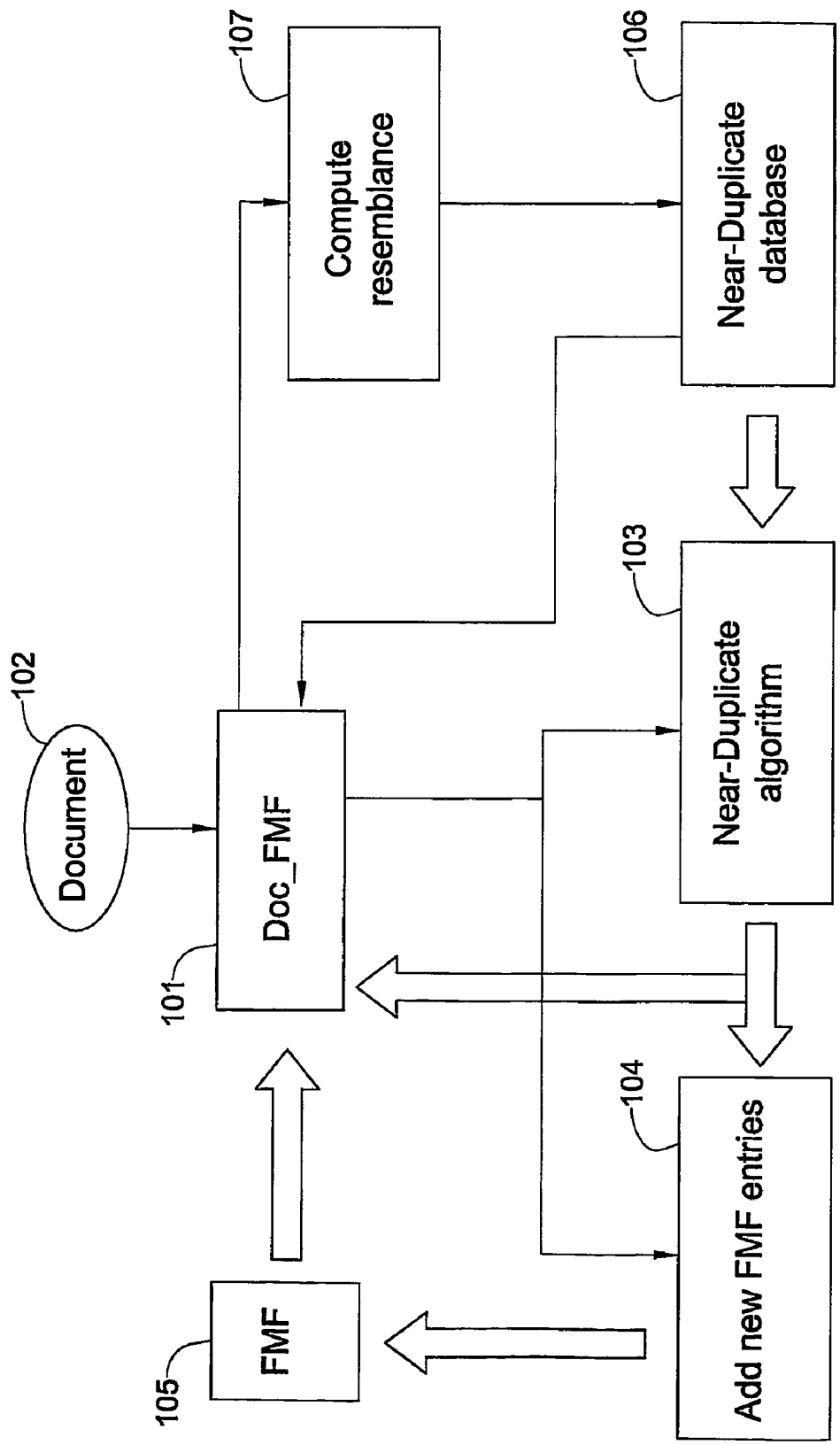
FIG. 10 illustrates a system architecture in accordance with an embodiment of the invention.

Attention is now drawn to FIG. 10 illustrating a system architecture in accordance with an embodiment of the invention, operating in accordance with the sequence of operation of FIG. 9. The main difference between the architecture of FIGS. 8 and 10 is that unlike the embodiment of FIG. 8, in accordance with the embodiment of FIG. 10 the Doc_FMF module 101 (corresponding to module 86 of FIG. 8) is applied to the documents 102 before the near duplicate procedure 103 (corresponding to module 81) is used. This would lead to masking noises (e.g. introduced by OCR) before applying the near duplicate technique and thereby masking, in advance, the adverse effect of OCR introduced errors when comparing documents for determining whether they are near duplicate. This would naturally lead to improved level of similarity and in accordance with a certain embodiment to the advantage that similarity set of documents is improved. Thus, for example, two documents which have a level of similarity which drops below the desired threshold for being members in the same Equiset, will nevertheless belong to the same Equiset (i.e. meet the specified threshold) if OCR introduced noise features are masked before applying the near duplicate technique. Reverting to FIG. 10, the enrichment of glossary (through FMF module 104 and entry table 105) is performed in a similar fashion to that described with reference to modules 84 and 85 of FIG. 8. Note, however, that the glossary enrichment procedure will be applied to similar masked documents (e.g. DOC_FMF(DOC1), DOC_FMF(DOC2)) instead of similar documents DOC1,DOC2 (as is the case with FIG. 8). Thus, for instance, in the specific embodiment of FIG. 6, for determining FMF entries when used in connection with the Add new FMF entries module 104 of FIG. 10, step 66 would be Get all features that are:
    in DOC_FMF(D1) and not in DOC_FMF(D2): list1
    in DOC_FMF(D2) and not in DOC_FMF(D1): list2 whereas, in the specific embodiment of FIG. 6 for determining FMF entries when used in connection with the Add new FMF entries module 84 of FIG. 8, step 66 would be Get all features that are:
    in D1 and not in D2: list1
    in D2 and not in D1: list2

Reverting to FIG. 10, DOC_FMF module 101 is applied to similar DOC_FMF documents (see step 96b of FIG. 9) which are extracted from the near duplicate database 106 (corresponding to module 83 of FIG. 8), in order to mask additional noise features, if any, based on new FMF entries that are extracted from the glossary in FMF table 105 (see step 96b of FIG. 9). Next, (similar to FIG. 8), a resemblance module 107 is used to obtain better similarity level between DOC_FMF documents (step 96a of FIG. 9). The resulting similar documents and their similarity level score may be saved in database 106. In accordance with certain embodiments, the DOC_FMF module 101 may be applied to DOC_FMF documents (candidate documents Ci,—step 96a) by being applied to signatures of the documents and not to the raw documents. Thus, by way of non-limiting example, to sign on a document n classifiers are applied on the list of features of a document. The list of features is taken as words from the original document. In the above, we can take the list of features as list of features after the masking of the FMF.

Note that in accordance with certain embodiments, there is more than one FMF entry table 105 being used, as discussed above.

This example is of course not binding and other criteria may be applied for using two or more glossaries.

Bearing all this in mind, and for a better understanding of the foregoing, attention is drawn to the following example:

91 Start with an empty FMF function.
93 Take Doc1, and mark it as processed.
94 Compute its Doc_FMF, and
95 apply near-duplicate algorithm. Doc1 is the first document and has no near-duplicate candidates.
93 Take Doc2, and mark it as processed.
94 and 95 Compute its Doc_FMF, and apply near-duplicate algorithm.
The only candidate is Doc1 (C1),
96a compute the resemblance between Doc_FMF(Doc2) and Doc_FMF(Doc1) and get 80%. Note that its above TH (80%). Now, in accordance with 96b the similarity level is calculated among the difference features and in the case they meet a criterion (say EditDistance result=1), the features are masked, i.e. mapped to common value. In this example, the words "boy" and "b0y" meet the criterion (distance=1) and appropriate FMF entry "b0y" is inserted to the FMF table (step 96b see Table 4 below).

TABLE 4 constructing FMF entries based on Doc1 and Doc2

| Document pair | Differences found | Edit distance | FMF function | |
|---|---|---|---|---|
| | | | Old Entries | New Entries |
| Doc1, Doc2 | (boy, b0y) (dog, cat) | 1 3 | NULL | FMF(boy) = b0y |

96c Add Doc2 to the EquiSet of Doc1.
Moving on with Doc 3:
93 Take Doc3, and mark it as processed.
94 and 95 Compute its Doc_FMF, and apply near-duplicate algorithm. The candidates for near-duplicates are DOC1, and DOC2
96 Starting with DOC1, since the FMF table is not empty, the word "boy" in Doc3 is mapped to "b0y" (94). 96a compute resemblance between Doc_FMF(Doc1) and Doc_FMF (Doc3) and get 80% which is above TH, The 80% stems from the different pairs "dog" and "d0g" as well as "schol" and "school". Next, appropriate FMF entry is calculated 96b as follows:

| Document pair | Differences found | Edit distance | FMF function | |
|---|---|---|---|---|
| | | | Old Entries | New Entries |
| Doc1, Doc3 | (dog, d0g) (school, schol) | 1 1 | FMF(boy) = b0y | FMF(dog) = d0g FMF(school) = schol |

96c Add Doc3 to the EquiSet of Doc1.
Reverting to step 95, Another candidate for near duplicate to DOC_FMF(Doc3) is DOC_FMF(Doc2). 96a compute resemblance between Doc_FMF(Doc2) and Doc_FMF (Doc3) and get 80% which is above TH No new FMF entries are identified (step 96b), since "d0g" and "cat" are spaced apart by distance 3, and "boy" and "b0y" which are in distance 1 already defined in the lookup table, no new entries were identified in step 96b.

| Document pair | Differences found | Edit distance | FMF function | |
|---|---|---|---|---|
| | | | Old Entries | New Entries |
| Doc2, Doc3 | (cat, d0g) (school, schol) | 3 1 | FMF(boy) = b0y | Already in table |

96c Add Doc3 to the EquiSet of Doc2.

Reverting to FIG. 9, the next document for processing is DOC4.

93 Take Doc4, and mark it as processed.

94 and 95 Compute its Doc_FMF, ("boy" is mapped to "b0y" and "school" is mapped to "schol"), and apply near-duplicate algorithm. The candidates are Doc1, Doc2 and Doc3,

96a Starting with Doc 1, 96a compute resemblance between Doc_FMF(Doc1) and Doc_FMF(Doc4) and get 80% which is above TH because of "ca1" vs. "d0g" (FMF(dog)=d0g) and "go" vs. "g1". Since the similarity level meets the threshold, new FMF entry "go" is added for "go" and "g1" (spaced apart by a distance of 1)—step 96b, see table below:

| Document pair | Differences found | Edit distance | FMF function Old Entries | New Entries |
|---|---|---|---|---|
| Doc1, Doc4 | (dog, ca1) (go, g1) | 3 1 | FMF(boy) = b0y FMF(dog) = d0g FMF(school) = schol | FMF(go ) = g1 |

96c Add Doc1 to the EquiSet of Doc4.

96a Now move to the next candidates Doc2, 96a compute resemblance between Doc_FMF(Doc2) and Doc_FMF(Doc4) and get 80% which is above TH, eliminating the different OCR introduced error "g1", however, maintaining the discerning words "cat" vs. "ca1" and "school" vs. "stool" which do not have as yet FMF entries in the table (step 95). Due to the sufficiently high resemblance—80% (step 96a) new FMF entries are added meeting the Edit-Distance criterion. Thus, and as shown below, the words "school" and "schol" are mapped to "schol" and "cat" and "ca1" are mapped to "cat".

| Document pair | Differences found | Edit distance | FMF function Old Entries | New Entries |
|---|---|---|---|---|
| Doc2, Doc4 | (cat, ca1) | 1 | FMF(boy) = b0y FMF(dog) = d0g | FMF(cat) = ca1 |
| | (go, g1) | 1 | FMF(school) = schol | Already in table |
| | (school, scool) | 1 | | FMF(school) = FMF(schol) = scool |

96c Add Doc2 to the EquiSet of Doc4.

96a Now move to the next candidates Doc3, 96a compute resemblance between Doc_FMF(Doc2) and Doc_FMF (Doc4) and get 90% which is above TH due to the discerning words "d0g" and "ca1". Since the distance between the latter words is 3, no new FMF entries are inserted and no further improvement is accomplished (step 96b)

| Document pair | Differences found | Edit distance | FMF function Old Entries | New Entries |
|---|---|---|---|---|
| Doc3, Doc4 | (dog, ca1) (go, g1) | 3 1 | FMF(boy) = b0y FMF(dog) = d0g | Already in table |
| | (schol, scool) | 1 | FMF(school) = schol | Already in table |

96c Add Doc3 to the EquiSet of Doc4.

Using this improvement the algorithm creates an Equiset (80%) with 4 documents (Doc1, Doc2, Doc3, Doc4) (step 96c, for all candidates that their resemblance with Doc4 is above the 80% TH).

To sum up, in accordance with this example, the FMF function has the following entries:
FMF(boy)=b0y
FMF(dog)=d0g
FMF(school)=FMF(schol)=scool
FMF(go)=g1
FMF(cat)=ca1

The similarities between the documents within the Equiset are:

TABLE 4

Similarity level between documents

| | | Extracted documents | After mapping | |
|---|---|---|---|---|
| Doc1 | Doc2 | The boy and his dog go to school every day The b0y and his cat go to school every day | The b0y and his d0g g1 to scool every day The b0y and his ca1 g1 to scool every day | 90 |
| Doc1 | Doc3 | The boy and his dog go to school every day The b0y and his d0g go to schol every day | The b0y and his d0g g1 to scool every day The b0y and his d0g g1 to scool every day | 100 |
| Doc1 | Doc4 | The boy and his dog go to school every day The b0y and his ca1 g1 to scool every day | The b0y and his dog g1 to scool every day The b0y and his ca1 g1 to scool every day | 90 |
| Doc2 | Doc3 | The b0y and his cat go to school every day The b0y and his d0g go to schol every day | The b0y and his ca1 g1 to scool every day The b0y and his d0g g1 to scool every day | 90 |
| Doc2 | Doc4 | The b0y and his cat go to school every day The b0y and his ca1 g1 to scool every day | The b0y and his ca1 g1 to scool every day The b0y and his ca1 g1 to scool every day | 100 |
| Doc3 | Doc4 | The b0y and his d0g go to school every day The b0y and his ca1 g1 to scool every day | The b0y and his d0g g1 to scool every day The b0y and his ca1 g1 to scool every day | 90 |

Table 4 illustrates the final resemblance between documents after all FMF entries are processed.

As readily arises, the similarity level between documents as shown in Table 4 (in accordance with the sequence of operations discussed with reference to FIG. 9) has been improved compared to the similarity level between documents as shown in Table 3 (in accordance with the sequence of operations discussed with reference to FIG. 7). More specifically, the similarity level between Doc1 and Doc4 has been improved to 90% compared to 70%. The similarity level between Doc2 and Doc3 has been improved to 100% compared to 70% and between Doc3 and Doc4 has been improved to 90% compared to 70%. And Doc1, Doc2, Doc3 and Doc4 are all in the same similarity set.

It should be noted generally, that the description with reference to creation of FMF function in accordance with FIG. 6, and/or specific sequences of operation with reference to FIG. 7, and/or specific sequences of operation with reference to FIG. 9, and/or the specific system architecture of FIG. 8, and/or the specific system architecture of FIG. 10 are by no means binding and other variants are applicable all as required and appropriate.

Note that in accordance with certain embodiments, if documents are different one with respect to the other only due to errors, the techniques described above the invention would mask the noisy effect of the OCR and identify that the documents are identical.

In accordance with a certain embodiment, the specified procedures can be used a matrix. Thus, by way of non-limiting example, for each processed document, the values of the different functions thereof are stored. One way to store them is in a matrix, where each row represents a document, and each column j the value of the j'th function on that document. s In accordance with a certain embodiment, there is provided a search engine utility for searching noisy data, for example data that was OCR-ed. In such a case, a search for a given keyword(s) may yield only partial results as one or more occurrences of the keyword(s) in the corpus of data may be damaged, e.g. one may search for the word "dog", but the data contains the word "d0g" as a result of noise that converted "o" to "0". Assuming that the data was processed by one of the procedures described above, then errors can be masked e.g. by using FMF function. Thus, by this example, one will search for FMF (keyword) rather than for keyword itself. In other words, the glossary is used to mask OCR introduced errors, thereby facilitating location of "noisy" documents (e.g. those including "d0g" where the original intention is to locate documents that include "dog").

The invention can be used in various applications. Typical, yet not exclusive, examples of possible applications are: document management, content management, digitization, legal, business intelligence other forms of intelligence, search engines results, pre- and post-processing, archiving, source code comparisons, management of email servers, management of file servers, spam detection. These exemplary applications (and/or others) can be utilized in various marketing channels such as stand-alone products, as a component (OEM), etc. The specified applications may be applied online or offline, as required.

Note that in certain embodiments, a known per se voice to text module (or other means) may be employed such that input objects (being voice data) are converted to text based documents which then undergo near duplicate analysis according to selected embodiment(s) of the invention as described in detail above.

It will also be understood that the system and method according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention has been described with a certain degree of particularity, but those versed in the art will readily appreciate that various alterations and modifications may be carried out without departing from the scope of the following Claims:

What is claimed is:

1. A method for constructing a glossary operable to mask word noise features in at least two documents, the method comprising:

a) providing the at least two documents that are similar in accordance with a criterion, the word noise features being nominally identical features that appear differently in the documents;

b) providing a discrepancy list for the at least two documents that includes the word noise features; and c) constructing a glossary for masking the word noise features utilizing at least the discrepancy list, wherein said constructing includes:

mapping the word noise features utilizing said discrepancy list to common mapped features and automatically adding said mapped features to the glossary; and said mapping includes:

(i) identifying, utilizing said discrepancy list, a pair of word noise features appearing in respective two documents; and (ii) mapping said pair of word noise features to a common mapped feature including applying Feature Mapping Function (FMF) in respect of said pair of word noise features, said FMF gets a word noise feature in a document of said two documents and returns said mapped feature and in the case that said FMF is not in the glossary, adding said FMF to the glossary.

2. The method according to claim 1, further including:

determining if the pair of word noise features are close in accordance with a predefined criterion, and if in the affirmative applying said (ii).

3. The method according to claim 2, wherein said determining if the features are close in accordance with a predefined criterion includes:

applying an edit distance function between said features, where the function returns a value being a minimum number of operations such that said features become the same, and said predefined criterion is met if said returned value being equal or smaller than a predefined value.

4. The method according to claim 1, wherein applying said FMF includes:

a. calculating find the longest common substring (LCS) among features of the two documents;

b. based on computed LCS of first document and the first document, inserting all different features to a first vector, whereby a first different feature is in first entry of the first vector, and so on;

c. based on computed LCS of second document and the second document, inserting all different features to a second vector, whereby a first different feature is in first entry of the second vector and so on, and whereby sizes of said first and second vectors are identical; and d. for each entry i in said first vector and second vector, i. calculating edit distance between entry i in said first vector and second vector, and if the edit distance calculated value being equal or smaller than a predefined value, generating a mapped feature i, such that FMF(entry i of said first vector)=FMF(entry i of said second vector).

5. The method according to said claim 4, wherein said FMF is applied to an entire document.

6. The method according to claim 1, wherein said document that include word noise features being a document translated from a digital document that is obtained by scanning a source medium.

7. The method according to claim 6, wherein said translated document is obtained using Optical Character Recognition technique.

8. The method according to claim 7, further comprising:
maintaining a respective glossary per OCR or family of OCRs.

9. The method according to claim 1, wherein determination if said documents are similar in accordance with a criterion includes:
  (i) providing at least two different functions on an object, each function having a numeric function value; and
  (ii) determining that at least one document B is a candidate for near duplicate to an document A, if a condition is met, the condition includes: for any function $f_i$ from at least two of said functions, $|f_i(A)-f_i(B)| \leq \delta_i(f,th)$, wherein $\delta_i$ is dependent upon at least f,th.

10. The method according to claim 1, further comprising utilizing a natural language dictionary for determining if said pair of word noise features have a dictionary meaning and if in the affirmative, skipping said (ii).

11. A method for searching data using features, comprising:
  a. providing at least one feature for search data;
  b. utilizing the glossary according to claim 1, for masking at least one of said features, if any; and
  c. searching said data utilizing at least said masked features.

12. The method of claim 1, wherein said at least two documents are obtained, irrespective of the means that introduced said word noise features to said at least two documents.

13. A method for masking word noise features in a document wherein, owing to an error, at least one feature in the document is misrepresented and appears as a noise feature, the method comprising:
  a) maintaining a glossary that maps word noise features in documents to common mapped features;
  b) identifying at least one candidate document that is similar by at least a given threshold to said document, and for every candidate document, determining a discrepancy list that includes word noise features being nominally identical features that appear differently in the document and the candidate document, wherein
    said identifying at least one candidate document that is similar by at least a given threshold th to said document, comprising:
      (i) providing at least two different functions on an object, each function having a numeric function value; and
      (ii) determining that at least one document B is a candidate for near duplicate to an document A, if a condition is met, the condition includes: for at least two functions $f_i$ from among said functions, $|f_i(A)-f_i(B)| \leq \delta_i(f,th)$, wherein $\delta_i$ is dependent upon at least f,th; and
  c) utilizing the discrepancy list for comparing corresponding features that originate from the document and the candidate document respectively, and in the case that the corresponding features differ in less than a predetermined threshold, if the corresponding features appear in the glossary, automatically masking said features by replacing said corresponding features by said common mapped feature.

14. The method according to claim 13, wherein, after masking, said document and candidate document become identical.

15. The method according to claim 13, further comprising: calculating a similarity set of documents such that a document is a member in the set if exists another document in the set, such that the similarity level between the two documents is at least TH %.

16. The method according to claim 15, applicable to version control.

17. A system for constructing a glossary operable to mask word noise features in at least two documents, the system comprising:
  means for providing the at least two documents that are similar in accordance with a criterion, the word noise features being nominally identical features that appear differently in the documents;
  means for providing a discrepancy list for the at least two documents that include the word noise features; and
  constructing system for constructing a glossary for masking the word noise features utilizing at least the discrepancy list, wherein
  said constructing includes:
    mapping the word noise features utilizing said discrepancy list to common mapped features and automatically adding said mapped features to the glossary; and
  said mapping includes:
    (i) identifying, utilizing said discrepancy list, a pair of word noise features appearing in respective two documents; and
    (ii) mapping said pair of word noise features to a common mapped feature including applying Feature Mapping Function (FMF) in respect of said pair of word noise features, said FMF gets a word noise feature in a document of said two documents and returns said mapped feature and in the case that said FMF is not in the glossary, adding said FMF to the glossary.

18. A non-transitory program storage device readable by a machine, tangibly embodying a program of instructions executable by the machine to perform method steps for constructing a glossary operable to mask word noise features in at least two documents, comprising:
  a) providing the at least two documents that are similar in accordance with a criterion, the word noise features being nominally identical features that appear differently in the documents;
  b) providing a discrepancy list for the at least two documents that includes the word noise features; and
  c) constructing a glossary for masking the word noise features utilizing at least the discrepancy list, wherein
  said constructing the glossary includes:
    mapping the word noise features utilizing said discrepancy list to common mapped features and automatically adding said mapped features to the glossary; and
  said mapping includes:
    (i) identifying, utilizing said discrepancy list, a pair of word noise features appearing in respective two documents; and
    (ii) mapping said pair of word noise features to a common mapped feature including applying Feature Mapping Function (FMF) in respect of said pair of word noise features, said FMF gets a word noise feature in a document of said two documents and returns said mapped feature and in the case that said FMF is not in the glossary, adding said FMF to the glossary.

\* \* \* \* \*